US009716896B2

(12) United States Patent
Kazui et al.

(10) Patent No.: US 9,716,896 B2
(45) Date of Patent: Jul. 25, 2017

(54) VIDEO ENCODING APPARATUS, VIDEO DECODING APPARATUS, VIDEO ENCODING METHOD, AND VIDEO DECODING METHOD

(71) Applicant: FUJITSU LIMITED, Kawasaki-shi, Kanagawa (JP)

(72) Inventors: Kimihiko Kazui, Kawasaki (JP); Satoshi Shimada, Kawasaki (JP); Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/073,234

(22) Filed: Mar. 17, 2016

(65) Prior Publication Data

US 2016/0198178 A1 Jul. 7, 2016

Related U.S. Application Data

(62) Division of application No. 13/932,577, filed on Jul. 1, 2013, now Pat. No. 9,392,276.

(30) Foreign Application Priority Data

Jul. 2, 2012 (JP) .................................. 2012-148849

(51) Int. Cl.
*H04N 19/503* (2014.01)
*H04N 19/50* (2014.01)
(Continued)

(52) U.S. Cl.
CPC ........... *H04N 19/50* (2014.11); *G11B 27/031* (2013.01); *H04N 19/132* (2014.11); *H04N 19/44* (2014.11);
(Continued)

(58) Field of Classification Search
CPC ...... H04N 19/70; H04N 19/132; H04N 19/46; H04N 21/23424; H04N 19/68;
(Continued)

(56) References Cited

U.S. PATENT DOCUMENTS 6,314,139 B1  11/2001  Koto et al.
6,345,122 B1   2/2002  Yamato et al.
(Continued)

FOREIGN PATENT DOCUMENTS

CN  1275289 A1  11/2000
CN  101010952   8/2007
(Continued)

OTHER PUBLICATIONS

Office Action dated Sep. 24, 2015 in corresponding Taiwanese Patent Application No. 102122181.
(Continued)

*Primary Examiner* — Neil Mikeska
(74) *Attorney, Agent, or Firm* — Staas & Halsey LLP

(57) ABSTRACT

A video encoding apparatus appends decoding delay correction information and display delay correction information to encoded video data in order to ensure that even when one or more pictures that are later in encoding order in the video data than a first picture that may potentially be spliced to a trailing end of other encoded video data have been discarded, the first picture and subsequent pictures in the encoded video data can be continuously decoded and displayed by a video decoding apparatus. The video decoding apparatus corrects the decoding delay and display delay of the first picture and its subsequent pictures by using the decoding delay correction information and display delay correction information.

5 Claims, 17 Drawing Sheets

(51) Int. Cl.

| | | |
|---|---|---|
| *H04N 21/234* | (2011.01) | |
| *H04N 21/44* | (2011.01) | |
| *G11B 27/031* | (2006.01) | |
| *H04N 19/70* | (2014.01) | |
| *H04N 19/68* | (2014.01) | |
| *H04N 19/44* | (2014.01) | |
| *H04N 19/132* | (2014.01) | |
| *H04N 19/46* | (2014.01) | |

(52) U.S. Cl.
CPC ........... *H04N 19/46* (2014.11); *H04N 19/503* (2014.11); *H04N 19/68* (2014.11); *H04N 19/70* (2014.11); *H04N 21/23424* (2013.01); *H04N 21/44016* (2013.01)

(58) Field of Classification Search
CPC ................. H04N 19/44; H04N 19/503; H04N 21/44016; H04N 19/50; G11B 27/031
See application file for complete search history.

(56) References Cited

U.S. PATENT DOCUMENTS

| 6,937,770 | B1 | 8/2005 | Oguz et al. |
|---|---|---|---|
| 7,031,348 | B1 | 4/2006 | Gazit |
| 7,096,481 | B1 | 8/2006 | Forecast et al. |
| 7,760,802 | B2 | 7/2010 | Wang et al. |
| 2002/0168012 | A1 | 11/2002 | Ramaswamy |
| 2005/0105883 | A1 | 5/2005 | Holcomb et al. |
| 2006/0072671 | A1 | 4/2006 | Aggarwal et al. |
| 2006/0093315 | A1 | 5/2006 | Kelly et al. |
| 2007/0030897 | A1 | 2/2007 | Ito |
| 2007/0058729 | A1 | 3/2007 | Yoshinari |
| 2007/0292110 | A1 | 12/2007 | Nishi et al. |
| 2008/0056383 | A1 | 3/2008 | Ueki et al. |
| 2009/0100482 | A1 | 4/2009 | Rodriguez et al. |
| 2009/0180546 | A1 | 7/2009 | Rodriguez et al. |
| 2010/0074340 | A1 | 3/2010 | Luo et al. |
| 2010/0293571 | A1 | 11/2010 | Rodriguez et al. |
| 2012/0099022 | A1 | 4/2012 | Sundy et al. |
| 2012/0230652 | A1 | 9/2012 | Mirsky et al. |
| 2013/0273945 | A1 | 10/2013 | Deshpande |
| 2014/0003508 | A1 | 1/2014 | Kazui et al. |
| 2014/0003536 | A1 | 1/2014 | Wang et al. |

FOREIGN PATENT DOCUMENTS

| CN | 101606389 A | 12/2009 |
|---|---|---|
| EP | 1 406 452 A2 | 4/2004 |
| JP | 11-88874 | 3/1999 |
| JP | 11-205734 | 7/1999 |
| JP | 2003-179938 | 6/2003 |
| JP | 2005-151570 | 6/2005 |
| JP | 5891975 | 3/2016 |
| KR | 10-2009-0101457 | 9/2009 |
| WO | 99/52067 | 10/1999 |
| WO | 2008/085935 A1 | 7/2008 |

OTHER PUBLICATIONS

Office Action for U.S. Appl. No. 13/932,577 dated Sep. 14, 2015.
Office Action dated May 22, 2015 in corresponding Korean Patent Application No. 10-2014-0124985.
Office Action dated Feb. 13, 2015 in corresponding Canadian Patent Application No. 2,819,674.
Mexican Office Action dated Sep. 26, 2014 in corresponding Mexican Patent Application No. MX/a/2013/007730.
Korean Office Action mailed May 19, 2014 in corresponding Korean Patent Application No. 10-2013-0075980.
European Search Report published Aug. 13, 2014 in corresponding European Patent Application No. 13173545.8.
Kazui et al., "AHG9: Simple HEVC stream editing", Joint Collaborative Team on Video Coding (JCT-VC) of ITU-T SG 16 WP 3 and ISO/IEC JTC 1/SC 29/WG 11, 11th Meeting: Shanghai, China, Oct. 2012, pp. 1-14.
Kazui et al., "AHG9: New high-level syntax for simple HEVC stream editing", Joint Collaborative Team on Video Coding (JCT-VC) of ITU-T SG 16 WP 3 and ISO/IEC JTC 1/SC 29/WG 11, 10th Meeting: Stockholm, Sweden, Jul. 2012, pp. 1-11.
Deshpande et al., "HRD Buffering for Bitstreams Starting with CRA Picture", Joint Collaborative Team on Video Coding (JCT-VC) of ITU-T SG16 WP3 and ISO/IEC JTC1/SC29/WG11, 9th Meeting: Geneva, Switzerland, Apr.-May 2012, pp. 1-6.
B. Bross et al.; "High Efficiency Video Coding (HEVC) text specification draft 7"; $9^{th}$ Meeting of Joint Collaborative Team on Video Coding; JCTVC-I1003; 2012; pp. i-xviii, 1-279.
U.S. Appl. No. 13/932,577, filed Jul. 1, 2013, Kazui et al., Fujitsu Limited.
Notice of Allowance in co-pending U.S. Appl. No. 13/932,577 mailed Apr. 5, 2016.
Notice of Allowance for co-pending U.S. Appl. No. 15/073,261 dated Jun. 8, 2016.
Office Action dated Sep. 27, 2016 in corresponding Chinese Patent Application No. 201310258424.3.
Office Action dated Nov. 18, 2016 in corresponding Canadian Patent Application No. 2,903,898.
Office Action dated Dec. 13, 2016 in corresponding Japanese Patent Application No. 2016-034346.
Decision on Appeal dated Feb. 23, 2017 in corresponding Korean Patent Application No. 10-2014-0124985.
Canadian Office Action dated Mar. 2, 2016 in Canadian Patent Application No. 2,819,674.
Office Action for Chinese Application No. 210310258424.3 issued Mar. 10, 2016.
Office Action dated Mar. 17, 2017 in corresponding Taiwanese Patent Application No. 105109873.
Office Action dated Mar. 17, 2017 in corresponding Taiwanese Patent Application No. 105109874.
Office Action dated Mar. 17, 2017 in corresponding Taiwanese Patent Application No. 105109877.
Notice of Allowance for co-pending U.S. Appl. No. 15/073,243 mailed Apr. 18, 2017.
Office Action for Chinese Patent Application No. 201310258424.3 dated Apr. 28, 2017.

VIDEO ENCODING APPARATUS, VIDEO DECODING APPARATUS, VIDEO ENCODING METHOD, AND VIDEO DECODING METHOD

CROSS-REFERENCE TO RELATED APPLICATION

This application is a divisional of U.S. Ser. No. 13/932,577, filed Jul. 1, 2013, which is based upon and claims the benefit of priority of the prior Japanese Patent Application No. 2012-148849, filed on Jul. 2, 2012, the entire contents of both are incorporated herein by reference.

FIELD

The embodiments discussed herein are related to a video encoding apparatus and video encoding method that can edit encoded video data without decoding the video data, and also relates to a video decoding apparatus and video decoding method for decoding video data encoded by such a video encoding apparatus.

BACKGROUND

Generally, the amount of data used to represent video data is very large. Accordingly, an apparatus handling such video data compresses the video data by encoding before transmitting the video data to another apparatus or before storing the video data in a storage device. Coding standards such as MPEG-2 (Moving Picture Experts Group Phase 2), MPEG-4, and H.264 MPEG-4 Advanced Video Coding (MPEG-4 AVC/H.264), devised by the International Standardization Organization/International Electrotechnical Commission (ISO/IEC), are typical video coding standards widely used today.

Such coding standards employ an inter-coding method that encodes a picture by using not only information from itself but also information from pictures before and after it, and an intra-coding method that encodes a picture by using only information contained in the picture to be encoded. The inter-coding method uses three types of pictures, referred to as the intra-coded picture (I picture), the forward predicted picture (P picture) which is usually predicted from a past picture, and the bidirectional predicted picture (B picture) which is usually predicted from both past and future pictures.

Generally, the amount of code of a picture or block encoded by inter-coding is smaller than the amount of code of a picture or block encoded by intra-coding. In this way, the amount of code varies from picture to picture within the same video sequence, depending on the coding mode selected. Similarly, the amount of code varies from block to block within the same picture, depending on the coding mode selected. Therefore, in order to enable a data stream containing encoded video to be transmitted at a constant transmission rate even if the amount of code temporally varies, a transmit buffer for buffering the data stream is provided at the transmitting end, and a receive buffer for buffering the data stream is provided at the receiving end.

MPEG-2 and MPEG-4 AVC/H.264 each define the behavior of a receive buffer in an idealized video decoding apparatus referred to as the video buffering verifier (VBV) or the coded picture buffer (CPB), respectively. For convenience, the idealized video decoding apparatus will hereinafter be referred to simply as the idealized decoder. It is specified that the idealized decoder performs instantaneous decoding that takes zero time to decode. For example, Japanese Laid-open Patent Publication No. 2003-179938 discloses a video encoder control method concerning the VBV.

In order for the receive buffer in the idealized decoder to not overflow or underflow, the video encoder controls the amount of code to guarantee that all the data needed to decode a given picture are available in the receive buffer when the idealized decoder decodes that given picture.

When the video encoder is transmitting an encoded video data stream at a constant transmission rate, the receive buffer may underflow if the transmission of the data needed to decode the picture has not been completed by the time the picture is to be decoded and displayed by the video decoder. In other words, the receive buffer underflow refers to a situation in which the data needed to decode the picture are not available in the receive buffer of the video decoder. If this happens, the video decoder is unable to perform decoding, and frame skipping occurs.

In view of this, the video decoder displays the picture after delaying the stream by a prescribed time from its receive time so that the decoding can be done without causing the receive buffer to underflow. As described earlier, it is specified that the idealized decoder accomplishes decoding in zero time. As a result, if the input time of the i-th picture to the video encoder is $t(i)$, and the decode time of the i-th picture at the idealized decoder is $tr(i)$, then the earliest time at which the picture becomes ready for display is the same as $tr(i)$. Since the picture display period $\{t(i+1)-t(i)\}$ is equal to $\{tr(i+1)-tr(i)\}$ for any picture, the decode time $tr(i)$ is given as $tr(i)=t(i)+dly$, i.e., the time delayed by a fixed time dly from the input time $t(i)$. This means that the video encoder has to complete the transmission of all the data needed for decoding to the receive buffer by the time $tr(i)$.

Referring to FIG. 1, a description will be given of how the receive buffer operates. In FIG. 1, the abscissa represents the time, and the ordinate represents the buffer occupancy of the receive buffer. Solid line graph 100 depicts the buffer occupancy as a function of time.

The buffer occupancy of the receive buffer is restored at a rate synchronized to a prescribed transmission rate, and the data used for decoding each picture is retrieved from the buffer at the decode time of the picture. The data of the i-th picture starts to be input to the receive buffer at time $at(i)$, and the final data of the i-th picture is input at time $ft(i)$. The idealized decoder completes the decoding of the i-th picture at time $tr(i)$, and thus the i-th picture becomes ready for display at time $tr(i)$. However, if the data stream contains a B picture, the actual display time of the i-th picture may become later than $tr(i)$ due to the occurrence of picture reordering (changing the encoding order).

The method of describing the decode time and display time of each picture in MPEG-4 AVC/H.264 will be described in detail below.

In MPEG-4 AVC/H.264, supplemental information not directly relevant to the decoding of pixels is described in a supplemental enhancement information (SEI) message. Tens of SEI message types are defined, and each type is identified by a payloadType parameter. The SEI is appended to each picture.

BPSEI (Buffering Period SEI) as one type of SEI is appended to a self-contained picture, i.e., a picture (generally, an I picture) that can be decoded without any past pictures. A parameter InitialCpbRemovalDelay is described in the BPSEI. The InitialCpbRemovalDelay parameter indicates the difference between the time of arrival in the receive buffer of the first bit of the BPSEI-appended picture and the decode time of the BPSEI-appended picture. The resolution of the difference is 90 kHz. The decode time tr(0) of the first picture is the time of arrival in the video decoder of the first bit of the encoded video data (the time is designated as 0); i.e., the decode time is delayed from time at(0) by an amount of time equal to InitialCpbRemovalDelay÷90,000 [sec].

Generally, PTSEI (Picture Timing SEI) as one type of SEI is appended to each picture. Parameters CpbRemovalDelay and DpbOutputDelay are described in the PTSEI. The CpbRemovalDelay parameter indicates the difference between the decode time of the immediately preceding BPSEI-appended picture and the decode time of the PTSEI-appended picture. The DpbOutputDelay parameter indicates the difference between the decode time of the PTSEI-appended picture and the display time of the picture. The resolution of these differences is one field picture interval. Accordingly, when the picture is a frame, the value of each of the parameters CpbRemovalDelay and DpbOutputDelay is a multiple of 2.

The decode time tr(i) of each of the second and subsequent pictures is delayed from the decode time tr(0) of the first picture by an amount of time equal to tc*CpbRemovalDelay(i) [sec]. CpbRemovalDelay(i) is the CpbRemovalDelay appended to the i-th picture. On the other hand, tc is the inter-picture time interval [sec]; for example, in the case of 29.97-Hz progressive video, tc is 1001/60000.

The display time of each of the pictures, including the BPSEI-appended picture, is delayed from tr(i) by an amount of time equal to tc*DpbOutputDelay(i). DpbOutputDelay(i) is the DpbOutputDelay appended to the i-th picture. In other words, after time tr(0), each picture is decoded and displayed at time equal to an integral multiple of tc.

Depending on the purpose of video data, the encoded video may be edited. Editing the encoded video involves dividing the encoded video data into smaller portions and splicing them to generate a new encoded video data stream. For example, insertion of another video stream (for example, an advertisement) into the currently broadcast video stream (i.e., splicing) is one example of editing.

When editing inter-frame predictive coded video, particularly in the case of an inter-coded picture, the encoded picture cannot be decoded correctly by itself. Accordingly, when splicing two encoded video data streams at a desired picture position, an encoded video data editing machine first decodes the two encoded video data streams to be spliced and then splice them on a decoded picture-by-picture basis, and thereafter re-encodes the spliced video data.

However, since re-encoding can be very laborious, in particular, in the case of real time processing such as splicing, it is common to restrict the splicing point and edit the encoded video data directly by eliminating the need for re-encoding. When splicing two encoded video data streams by editing without the need for re-encoding, the first picture of the encoded video data stream to be spliced on the temporally downstream side has to be an I picture. Furthermore, the GOP structure of the encoded video data stream to be spliced on the temporally downstream side is limited to the so-called closed GOP structure in which all the pictures that follow the starting I picture are decodable without referring to any pictures temporally preceding the starting I picture. With this arrangement, it is possible to correctly decode all the pictures that follow the starting I picture of the encoded video data stream spliced on the downstream side by editing at the desired splicing point.

However, since the coding efficiency of the closed GOP structure is lower than that of the non-closed GOP structure, the non-closed GOP structure may be employed. In that case, some of the pictures immediately following the starting I picture after the splicing point are not correctly decoded, but since these pictures precede the starting I picture in display order, there will be no problem if they are not displayed. Therefore, as a general practice, after displaying the last picture of the temporally preceding encoded video data stream, the video decoder performs processing such as freezing the display, thereby masking the display of the pictures that failed to be decoded correctly.

In the prior art, even when the inter-frame predictive coded video data is edited without re-encoding, the header information is also edited so that a discrepancy does not occur between the two encoded video data stream spliced together. For example, in MPEG-4 AVC/H.264, POC (Picture Order Count) and FrameNum are appended to the slice header in order to maintain the inter-picture temporal relationship and identify the reference picture. POC indicates the relative display order of the picture. FrameNum is a value that increments by 1 each time the reference picture appears in the encoded video. Since POC values and FrameNum values need to be continuous between the spliced two encoded video data stream, there arises a need to edit all of the POC values and FrameNum values in the encoded video data stream to be spliced on the downstream side of the temporally preceding encoded video data stream.

On the other hand, in the method disclosed in non-patent document JCTVC-I1003, "High-Efficiency Video Coding (HEVC) text specification Working Draft 7," Joint Collaborative Team on Video Coding of ITU-T SG16 WP3 and ISO/IEC JTC1/SC29/WG11, May 2012, FrameNum is abolished because a new method for identifying reference pictures has been introduced. Furthermore, since the POC value of the first picture of the encoded video data stream spliced on the downstream side need not have continuity with respect to the encoded video data stream spliced on the upstream side, there is no need to edit the slice header. In the method disclosed in the above non-patent document, a CRA (Clean Random Access) picture, a BLA (Broken Link Access) picture, and a TFD (Tagged For Discard) picture have been introduced as new picture types in addition to the IDR (Instantaneous Decoding Refresh) picture defined in MPEG-4 AVC/H.264.

Of these pictures, the CRA picture and the BLA picture are both self-contained pictures, i.e., pictures that do not refer to any other pictures, so that pictures that follow the CRA picture or the BLA picture can be decoded correctly. When the video decoder starts decoding starting with a CRA picture, for example, any subsequent pictures other than the TFD picture that immediately follows the CRA picture can be decoded correctly.

The TFD picture is a picture that appears immediately following the CRA picture or the BLA picture, and that refers to a picture appearing earlier than the CRA picture or the BLA picture in time order and in decoding order. In the case of the non-closed GOP structure that conforms to MPEG-2, the plurality of B pictures immediately following the I picture at the head of the GOP each correspond to the TFD picture.

The BLA picture occurs as a result of editing of the encoded video data. Of the spliced two encoded video data streams, the encoded video data stream spliced on the downstream side generally begins with a CRA picture, but if this CRA picture appears partway through the spliced encoded video data, its picture type is changed from the CRA picture to the BLA picture. In the method disclosed in the above non-patent document, when the BLA picture appears, the POC values are permitted to become discontinuous. Further, the TFD picture that immediately follows this BLA picture is unable to be decoded correctly from any point in the spliced encoded video data because the picture to be referred to by it is lost from the spliced encoded video data. Therefore, the video encoder may delete from the encoded video data any TFD picture that follows the BLA picture at the head of the encoded video data stream to be spliced on the downstream side.

SUMMARY

In the method disclosed in the above non-patent document, as in MPEG-4 AVC/H.264, the decode time and display time of each encoded picture are determined by using the parameters InitialCpbRemovalDelay, CpbRemovalDelay, and DpbOutputDelay. When splicing two encoded video data streams, the parameters CpbRemovalDelay and DpbOutputDelay of the picture after the splicing point need to be corrected to appropriate values in order to ensure continuous video decoding and display across the splicing point.

More specifically, the video encoder or the video decoder needs to correct the value of CpbRemovalDelay of the CRA picture at the head of the encoded video data stream spliced on the downstream side, based on the number of pictures that follow the last BPSEI-appended picture in the temporally preceding encoded video data stream. Furthermore, the video encoder or the video decoder increments the value of CpbRemovalDelay in order to ensure CPB buffer continuity. Further, when discarding the TFD picture in the encoded video data stream to be spliced on the downstream side, the video encoder or the video decoder needs to correct the value of CpbRemovalDelay of the picture to be decoded after the discarded TFD picture as well as the value of DpbOutputDelay of the first CRA picture after the splicing point.

Thus, in the method disclosed in the above non-patent document, there still exists a need to correct the contents of PTSEI when performing editing operations for splicing two encoded video data streams.

Accordingly, it is an object of the present invention to provide a motion video encoding apparatus and motion video decoding apparatus that can ensure continuous video decoding process and display process without editing the parameters in the header of the original encoded video data when splicing two inter-frame predictive encoded video data streams.

According to one embodiment, a video encoding apparatus for encoding video data by inter-frame predictive coding is provided. The video encoding apparatus includes: an encoding control unit which obtains decoding delay correction information and display delay correction information for ensuring that even when one or more pictures that are later in encoding order in the video data than a first picture that may potentially be spliced to a trailing end of other encoded video data have been discarded, the first picture and subsequent pictures in the encoded video data can be continuously decoded and displayed by a video decoding apparatus; and a picture encoding unit which encodes each picture contained in the video data and appends the decoding delay correction information and the display delay correction information to the video data encoded.

According to another embodiment, a video decoding apparatus for decoding video data encoded by inter-frame predictive coding is provided. The video decoding apparatus includes: a picture decoding/display time determining unit which, when the encoded video data contains information indicating that the encoded video data has been generated by splicing second encoded video data to a trailing end of first encoded video data, information indicating that one or more encoded pictures that are later in encoding order than a starting encoded picture in the second encoded video data after a splicing point at which the first encoded video data and the second encoded video data are spliced have been discarded, decoding delay correction information for correcting a decoding delay of a picture that follows the starting encoded picture, and display delay correction information for correcting a display delay of the starting encoded picture, then corrects the display delay of the starting encoded picture based on the display delay correction information, while also correcting, based on the decoding delay correction information, the decoding delay of the picture that follows the starting encoded picture.

DESCRIPTION OF EMBODIMENTS

Video encoding apparatus and video decoding apparatus according to various embodiments will be described below with reference to the drawings. When splicing two encoded video data streams without decoding them, the video encoding apparatus computes the values to be used for correcting the parameters indicating the decode time and display time of each picture appearing after the splicing point, and adds the values in the header information of each picture appearing after the splicing point. In this way, the video encoding apparatus eliminates the need to edit the parameters in the header of the original encoded video data when splicing two encoded video data streams.

In the present embodiments, the picture is a frame. However, the picture may not be limited to a frame, but may be a field. A frame refers to one complete still image in the video data, while a field refers to a still image obtained by extracting data only in the odd-numbered lines or even-numbered lines from one frame. The encoded video data may be color video data or monochrome video data.

First, referring to FIG. 2, the values of picture decoding delay CpbRemovalDelay and display delay DpbOutputDelay according to a first embodiment will be described by taking one picture coding structure as an example.

Figure 1:
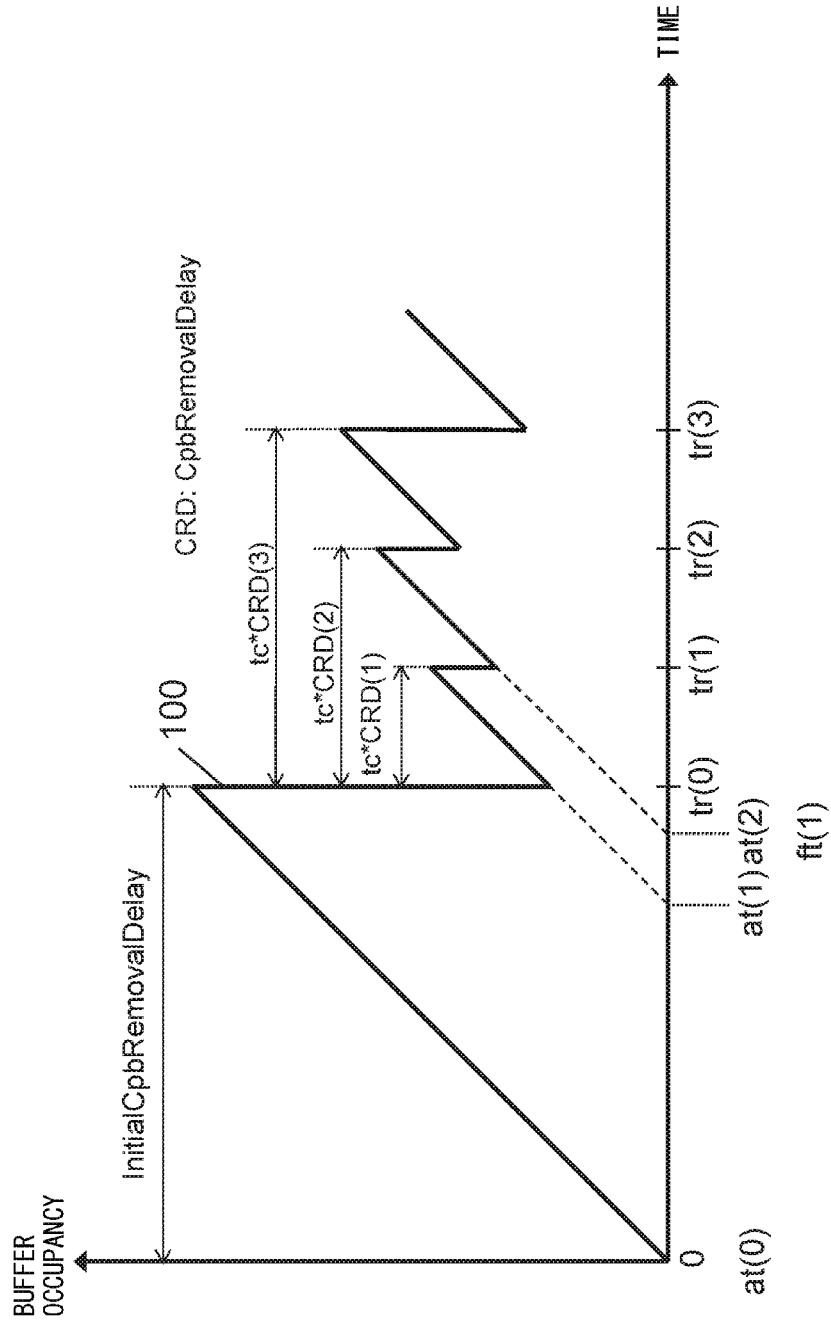
FIG. 1 is a diagram illustrating the relationship between the buffer occupancy of a receive buffer and the display time.
Figure 2:
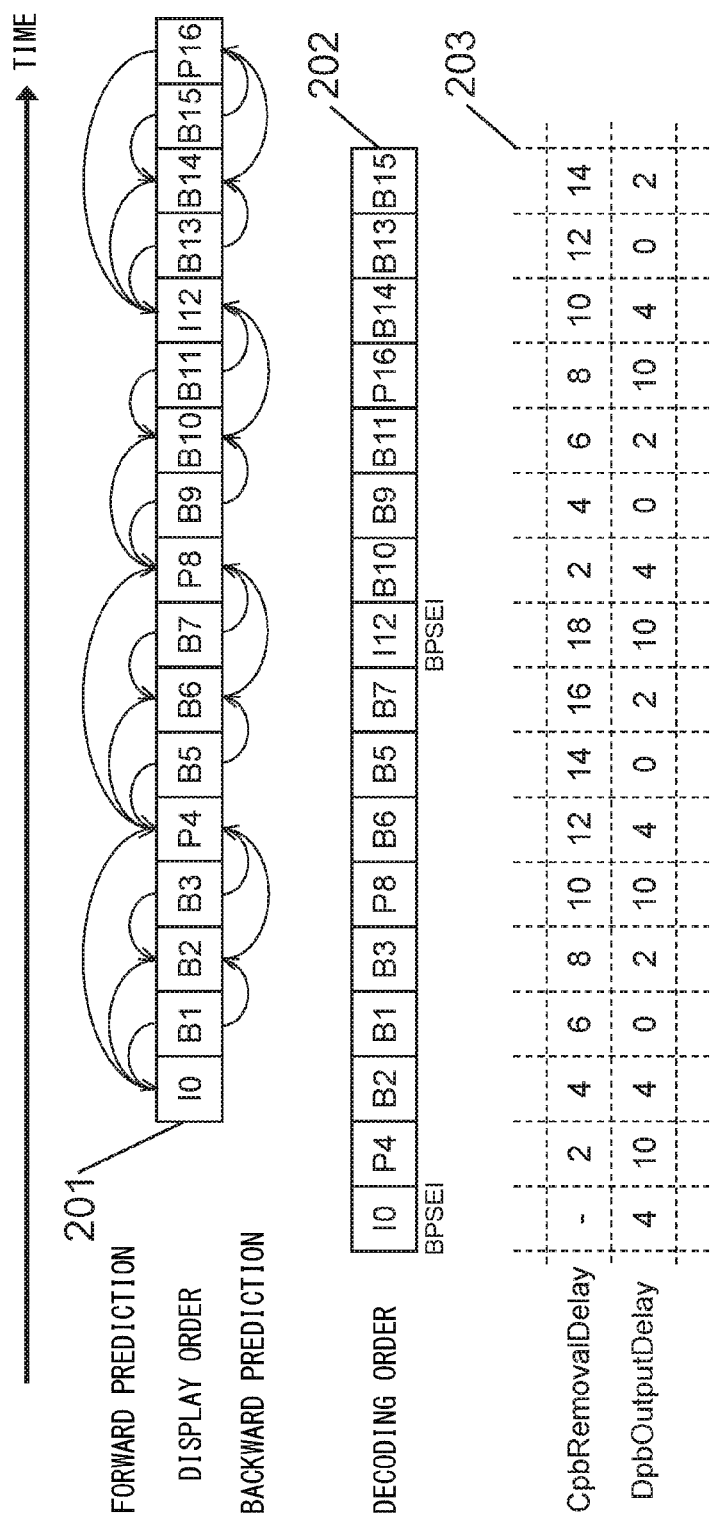
FIG. 2 is a diagram illustrating the relationship between the display order and decoding order of various pictures contained in video data and the decoding delay and display delay values of the respective pictures.

In FIG. 2, the picture coding structure 201 as one example of the picture coding structure contains a plurality of pictures. Each block in the picture coding structure 201 represents one picture. Of the two characters carried in the block corresponding to each picture, the alphabetic character at the left indicates the coding mode applied to the picture. The characters I, P, and B mean I picture, P picture, and B picture, respectively. Of the two characters carried in each block, the number at the right indicates the order of input to the video encoding apparatus. The input order coincides with the order in which the picture is output from the video decoding apparatus. Each arrow depicted above the picture coding structure 201 indicates the reference picture to which a picture to be encoded by forward frame prediction refers. For example, a picture P4 refers to a picture I0 that appears earlier than the picture P4. On the other hand, each arrow depicted below the picture coding structure 201 indicates the reference picture to which a picture to be encoded by backward frame prediction refers. For example, a picture B2 refers to the picture P4 that appears later than the picture B2.

The picture sequence presented below the picture coding structure 201 is the decoding order 202 of the pictures contained in the picture coding structure 201. Each block in the decoding order 202 represents one picture and, as in the case of the picture coding structure 201, the characters carried in the block indicate the coding mode and the order of input to the video encoding apparatus. The decoding order 202 coincides with the order of encoding performed by the video encoding apparatus.

In the decoding order 202, BPSEI is appended to each picture that carries the designation "BPSEI" thereunder. In the illustrated example, BPSEI is appended to every I picture. In other words, for every I picture, the InitialCpbRemovalDelay parameter that indicates the difference between the time of arrival in the receive buffer of the first bit of the I picture and the decode time of the I picture is defined.

A block array 203 presented below the decoding order 202 indicates the values of CpbRemovalDelay and DpbOutputDelay carried in PTSEI appended to each picture. Each block in the upper row of the block array 203 carries the value of CpbRemovalDelay for the corresponding picture in the decoding order 202 located directly above that block. Likewise, each block in the lower row of the block array 203 carries the value of DpbOutputDelay for the corresponding picture in the decoding order 202 located directly above that block. CpbRemovalDelay corresponds to the order of encoding as counted from the most recent picture in the encoding order among the pictures to which BPSEI is appended. For example, a picture P8 is the fifth picture in the encoding order as counted from the picture I0. In the present embodiment, since each picture is a frame, and the inter-picture time interval tc is a value expressed in units of fields, the CpbRemovalDelay value of the picture P8 is given as 10 (=5*2).

On the other hand, DpbOutputDelay specifies the display delay that is needed in the video decoding apparatus to sequentially output the pictures in the correct order. For example, the DpbOutputDelay value of the picture P4 is 10. This is the delay needed to correctly display the picture B1 whose difference between the input order and the encoding order in the video encoding apparatus is the largest. In other words, since the picture B1 is decoded with a delay of two pictures after the picture P4 is decoded, the display time of the picture P4 has to be further delayed by three picture times from the earliest time at which the picture B1 becomes ready for display, i.e., the time at which the picture B1 is decoded. Since the difference between the decode time and display time of the picture P4 is equal to five picture times, and since tc is expressed in units of fields, the value of DpbOutputDelay is given as 10.

Next, referring to FIG. 3, an explanation will be given of the values that, when two encoded video data streams are spliced, the decoding delay CpbRemovalDelay and display delay DpbOutputDelay of each picture in the encoded video data stream spliced downstream of the splicing point may take in order to eliminate any inconsistencies in decoding delay and display delay before and after the splicing point of the two encoded video data streams.

Each block in the first encoded video data stream 301 spliced upstream of the splicing point represents one picture, and the characters carried in the block indicate the coding mode and the order of input to the video encoding apparatus, as in the case of FIG. 2. In the illustrated example, the coding structure of the first encoded video data stream 301 is identical to the coding structure 201 depicted in FIG. 2.

In the illustrated example, the second video data stream 302 is spliced immediately following the last picture B15 of the first encoded video data stream. In the second video data stream 302 also, each block represents one picture, and the characters carried in the block indicate the coding mode and the order of input to the video encoding apparatus. The coding structure of the second encoded video data stream 302 also is identical to the coding structure 201 depicted in FIG. 2. In the illustrated example, the picture I72 and the subsequent pictures in the second encoded video data stream 302 are spliced so as to follow the picture B15 in the first encoded video data stream.

A block array 303 presented below the second encoded video data stream 302 indicates the values of the decoding delay CpbRemovalDelay and display delay DpbOutputDelay carried in PTSEI appended to each picture of the second encoded video data stream 302. Each block in the upper row of the block array 303 carries the value of the decoding delay CpbRemovalDelay for the corresponding picture in the second encoded video data stream 302 located directly above that block. Likewise, each block in the lower row of the block array 303 carries the value of the display delay DpbOutputDelay for the corresponding picture in the second encoded video data stream 302 located directly above that block.

Spliced encoded video data 304 generated by splicing the first and second encoded video data streams 301 and 302 is depicted below the block array 303. In the illustrated example, the picture B67 in the second encoded video data stream 302 and the pictures preceding the picture B67 in the encoding order are not contained in the spliced encoded video data 304. Further, the pictures B70, B69, and B71 each refer to the encoded picture 168 that precedes the picture I72 in the encoding order. As a result, when the data is spliced at the picture I72, the pictures B70, B69, and B71 would become unable to be correctly reproduced. Therefore, the pictures B70, B69, and B71 are discarded when splicing the data. However, the pictures B70, B69, and B71 may not be discarded and may be retained in the spliced encoded video data.

A block array 305 indicates the values of the decoding delay CpbRemovalDelay and display delay DpbOutputDelay that the pictures I72, P76, B74, B73, and B75 in the spliced encoded video data 304 are supposed to have. Each block in the upper row of the block array 305 carries the value of the decoding delay CpbRemovalDelay for the corresponding picture in the spliced encoded video data 304 located directly above that block. Likewise, each block in the lower row of the block array 305 carries the value of the display delay DpbOutputDelay for the corresponding picture in the spliced encoded video data 304 located directly above that block. The decoding delay CpbRemovalDelay of the picture I72, after splicing, needs to be made to match the encoded picture interval relative to the picture I12 which is the picture having the immediately preceding BPSEI; in the illustrated example, the picture I72 is the eighth picture in the encoding order as counted from the picture I12, and therefore, the decoding delay CpbRemovalDelay is given as 16. The display delay DpbOutputDelay of the picture I72 needs also to be corrected so that the picture B73 to be decoded later than the picture I72 can be correctly displayed. The value of the display delay DpbOutputDelay of the picture I72 is different before and after the discarding of the pictures B70, B69, and B71. The value of the display delay DpbOutputDelay after the discarding of the pictures B70, B69, and B71 corresponds to the number of pictures input to the video encoding apparatus later than the picture B69 but encoded earlier than the picture B69. In the illustrated example, there are two such pictures, the pictures I72 and B70, and therefore, the value of the display delay DpbOutputDelay of the picture I72 is given as 4.

The value of the decoding delay CpbRemovalDelay of each of the pictures P76, B74, B73, and B75 is also different before and after the discarding of the pictures B70, B69, and B71. The value of the decoding delay CpbRemovalDelay of each of the pictures P76, B74, B73, and B75 after the discarding of the pictures B70, B69, and B71 is equal to the value obtained by subtracting the value corresponding to the number of discarded pictures from the value of the decoding delay CpbRemovalDelay before the discarding of the pictures. In the illustrated example, the values of the decoding delay CpbRemovalDelay of the pictures P76, B74, B73, and B75 are given as 2, 4, 6, and 8, respectively, by subtracting 6 from the original values of the decoding delay CpbRemovalDelay of the respective signals. The value of the display delay DpbOutputDelay of each of the pictures P76, B74, B73, and B75 remains unchanged. Further, for any picture that was input later than the picture that would become the first CRA picture in the spliced encoded video data, neither the decoding delay CpbRemovalDelay nor the display delay DpbOutputDelay need be corrected.

As described above, when two encoded video data streams are spliced together, there arises a need at the time of decoding to correct the values of the decoding delay CpbRemovalDelay and display delay DpbOutputDelay for some of the pictures contained in the encoded video data stream spliced downstream of the splicing point. In the present embodiment, instead of correcting the values of the decoding delay CpbRemovalDelay and display delay DpbOutputDelay of the affected pictures contained in the original encoded video data before splicing, the video encoding apparatus adds in the header of the encoded video data the parameters that can be used to change the values of the decoding delay CpbRemovalDelay and display delay DpbOutputDelay to appropriate values when the video decoding apparatus decodes the spliced encoded video data.

Next, referring to FIG. 4, the structure of the encoded video data according to the first embodiment will be described that contains the parameters that can be used to change the values of the decoding delay CpbRemovalDelay and display delay DpbOutputDelay to appropriate values.

Figure 4:
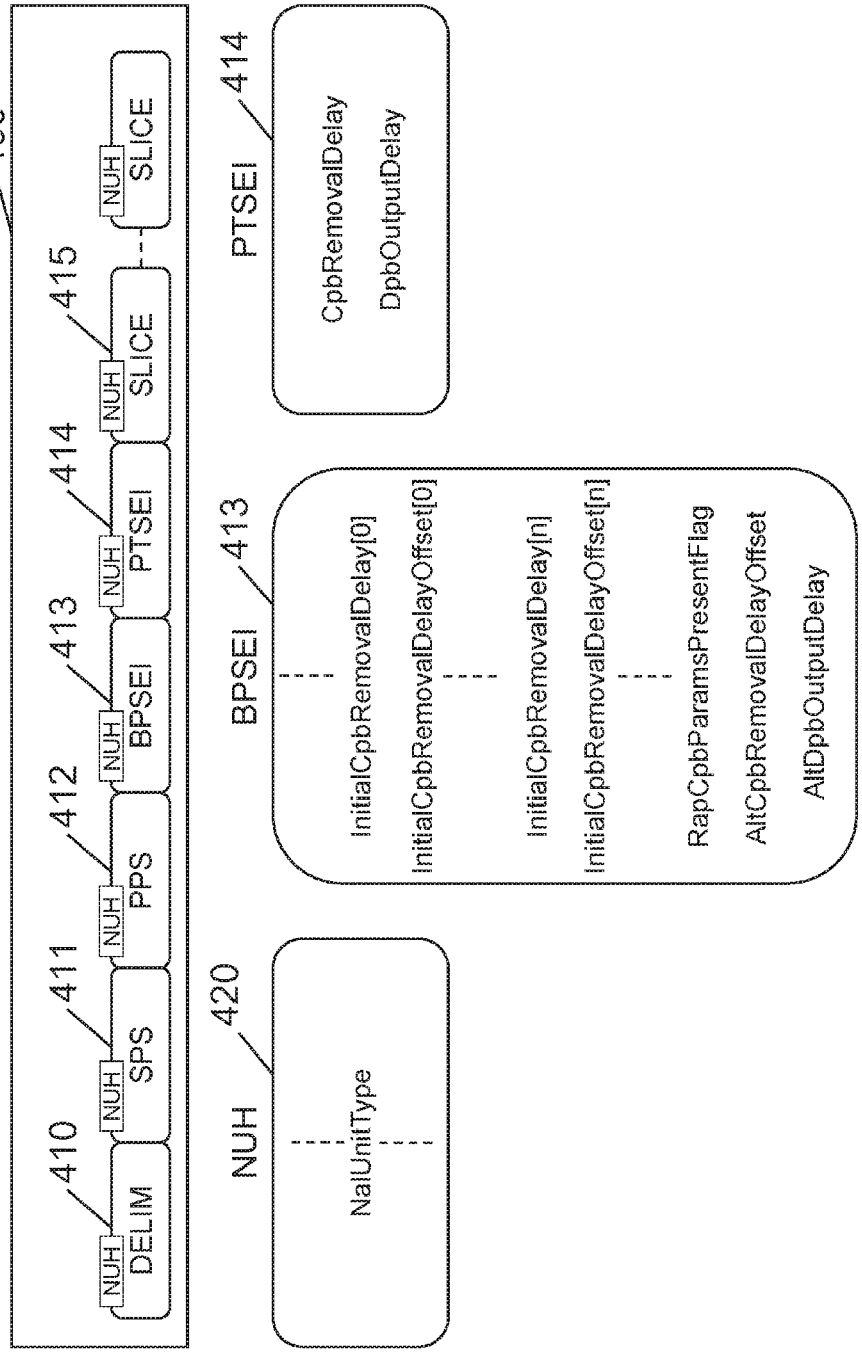
FIG. 4 is a diagram for explaining the data structure of one picture in encoded video according to a first embodiment.

As depicted in FIG. 4, the data structure 400 of one picture contains six kinds of network abstraction layer (NAL) units 410 to 415. These NAL units 410 to 415 each conform to the NAL unit defined in MPEG-4 AVC/H.264 and the method disclosed in the non-patent document JCTVC-I1003, "High-Efficiency Video Coding (HEVC) text specification Working Draft 7," Joint Collaborative Team on Video Coding of ITU-T SG16 WP3 and ISO/IEC JTC1/SC29/WG11, May 2012. A header NUH 420 is appended to each NAL unit. The header NUH 420 contains a NalUnitType field that indicates the type of the NAL unit. When NalUnitType is 4, the picture to which this header is appended is a self-contained CRA picture immediately after which appears a TFD picture that refers to a picture preceding the CRA picture in time order as well as in decoding order. When NalUnitType is 5, the picture to which this header is appended is a CRA picture immediately after which a TFD picture does not appear. When NalUnitType is 6, the picture to which this header is appended is a self-contained BLA picture that immediately follows the splicing point and that is immediately followed by a TFD picture. When NalUnitType is 7, the picture to which this header is appended is a BLA picture immediately after which a TFD picture does not appear. The NalUnitType value of each picture need not be limited to the above specific value, but may be set to some other suitable value.

The NAL units will be explained below.

The NAL unit 410 is a delimiter (DELIM) NAL unit and indicates a picture boundary.

The NAL unit 411 is a sequence parameter set (SPS) NAL unit which carries a set of parameters common to the entire sequence of the encoded video. The NAL unit 411 is appended to a self-contained picture.

The NAL unit 412 is a picture parameter set (PPS) NAL unit which carries a set of parameters common to a plurality of encoded pictures. The PPS NAL unit 412 is appended to a self-contained picture, and may sometimes be appended to other types of picture.

The NAL unit 413 is a BPSEI NAL unit which is appended only to a self-contained picture. In the present embodiment, the parameters to be used by the video decoding apparatus to correct the decoding delay and display delay of each picture appearing after the splicing point are added in this NAL unit 413.

The NAL unit 414 is a PTSEI NAL unit which is appended to every picture.

The NAL unit 415 is a slice (SLICE) NAL unit which is the substance of the encoded picture.

The BPSEI NAL unit 413 according to the present embodiment contains a number, (N+1), of InitialCpbRemovalDelay/InitialCpbRemovalDelayOffset field pairs (where N is an integer not smaller than 0) and a RapCpbParamsPresentFlag field that follows these pairs. When RapCpbParamsPresentFlag is 1, a decoding delay correction information AltCpbRemovalDelayOffset field 431 to be used for correcting the decoding delay and a display delay correction information AltDpbOutputDelay field 432 to be used for correcting the display delay are also contained in the BPSEI NAL unit 413. On the other hand, when RapCpbParamsPresentFlag is 0, neither the decoding delay correction information AltCpbRemovalDelayOffset field 431 nor the display delay correction information AltDpbOutputDelay field 432 is contained in the BPSEI NAL unit 413. A description of how the decoding delay correction information AltCpbRemovalDelayOffset field 431 and the display delay correction information AltDpbOutputDelay field 432 are determined and used will be given later.

The reason that there is more than one InitialCpbRemovalDelay/InitialCpbRemovalDelayOffset field pair is to describe the InitialCpbRemovalDelay and InitialCpbRemovalDelayOffset parameters suitable for the case where the encoded bit stream is transmitted at (N+1) different bit rates. The InitialCpbRemovalDelayOffset parameter defines the difference between the encoding completion time of the first picture in the video encoding apparatus and the start time of the transmission of the encoded picture data to the video decoding apparatus.

The PTSEI NAL unit 414 contains a decoding delay CpbRemovalDelay field and a DpbOutputDelay field. The definition of these fields may be the same as that given in the method disclosed in the earlier cited non-patent document or in MPEG-4 AVC/H.264.

Figure 5:
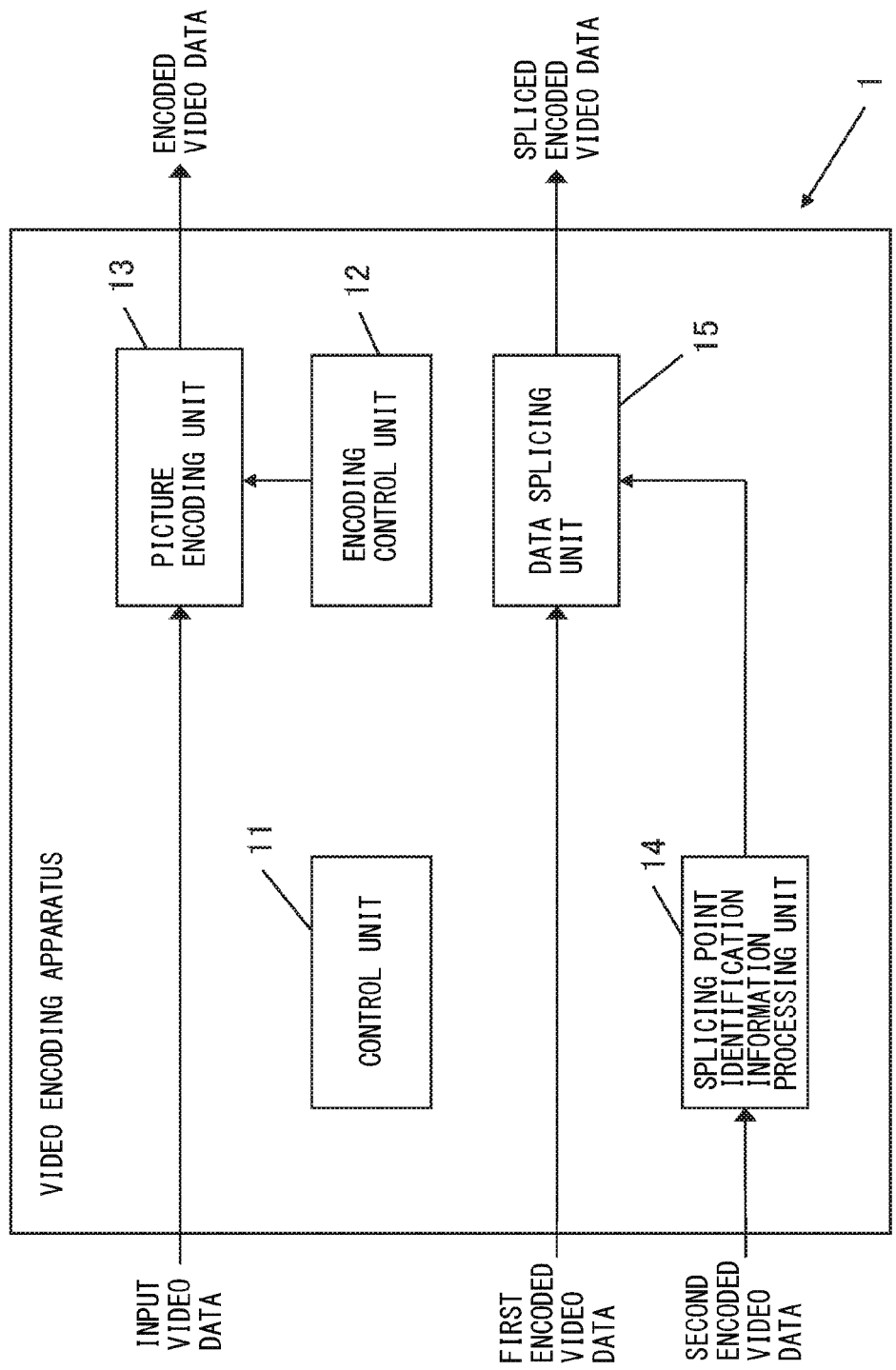
FIG. 5 is a simplified block diagram of a video encoding apparatus according to the first embodiment.

FIG. 5 is a simplified block diagram of the video encoding apparatus according to the first embodiment. The video encoding apparatus 1 includes a control unit 11, an encoding control unit 12, a picture encoding unit 13, a splicing point identification information processing unit 14, and a data splicing unit 15. These units constituting the video encoding apparatus 1 are each implemented as a separate circuit on the video encoding apparatus 1. Alternatively, these units constituting the video encoding apparatus 1 may be implemented on the video encoding apparatus 1 in the form of a single integrated circuit on which the circuits implementing the functions of the respective units are integrated. Further, these units constituting the video encoding apparatus 1 may be functional modules implemented by executing a computer program on a processor incorporated in the video encoding apparatus 1.

The control unit 11 controls the operation of each designated unit of the video encoding apparatus 1 when encoding the video data or when editing the encoded video data. For example, based on the reproduced image quality, compression ratio, etc., needed of the encoded video data, the control unit 11 determines the GOP structure, etc., that are applied to the video data to be encoded. Then, the control unit 11 signals the GOP structure, etc., to the encoding control unit 12.

First, a video encoding process for encoding the video data will be described. The video encoding process is carried out using the encoding control unit 12 and the picture encoding unit 13.

The encoding control unit 12 determines the encoding order, the coding mode (for example, intra-coding, forward prediction, or bidirectional prediction), etc., for each picture in accordance with the GOP structure signaled from the control unit 11. Then, based on the coding mode, the position within the GOP structure, etc., of each picture, the encoding control unit 12 determines the CRA picture insertion interval, the number of pictures to be reordered at the time of encoding, and the maximum display delay. In the example illustrated in FIG. 2, the CRA picture insertion interval is 12, the number of pictures to be reordered is 2, and the maximum display delay is 5. The encoding control unit 12 generates the header information of each picture based on these values.

For example, if the picture type is the I picture (CRA picture) which is encoded without referring to any other picture, and if the picture is not the starting picture of the encoded video data, then when the number of pictures to be reordered is not smaller than 1, the encoding control unit 12 sets NalUnitType in the NUH 420 of each slice of the picture to 4 which indicates that the picture is immediately followed by a TFD picture. On the other hand, when the number of pictures to be reordered is 0, the encoding control unit 12 sets NalUnitType in the NUH 420 of each slice of the picture to 5 which indicates that the picture is not immediately followed by a TFD picture. NalUnitType in the NUH 420 of each slice of the starting picture of the encoded video data is set to 8 (IDR picture). Further, when the number of pictures to be reordered is not smaller than 1, the encoding control unit 12 sets NalUnitType to 2 (TFD picture) for the non-reference picture that immediately follows the CRA picture and that refers to a picture which is earlier in both the decoding order and the display order than the CRA picture. For the other pictures, the encoding control unit 12 sets NalUnitType to 1.

The encoding control unit 12 notifies the picture encoding unit 13 of the value of NalUnitType that has been set in the header NUH 420 of each slice of the picture to be encoded. Further, the encoding control unit 12 obtains the values of the decoding delay CpbRemovalDelay and display delay DpbOutputDelay in the PTSEI of each picture from the picture prediction structure, as shown in FIG. 2, and notifies the picture encoding unit 13 accordingly.

When NalUnitType in the NUH 420 of each slice of the picture is 8, 4, or 5, the encoding control unit 12 appends BPSEI to the picture. Then, when NalUnitType is 8 or 5, the encoding control unit 12 sets RapCpbParamsPresentFlag to 0. On the other hand, when NalUnitType is 4, the encoding control unit 12 sets RapCpbParamsPresentFlag to 1.

Further, the encoding control unit 12 sets the value of the display delay correction information AltDpbOutputDelay parameter, which is used to correct the display delay, equal to twice the number of pictures to be reordered, i.e., twice the number of pictures that follow the CRA picture in the encoding order and that occur between the display time of the picture earliest in the decoding order and the display time of the CRA picture. Then, the encoding control unit 12 sets the value of the decoding delay correction information AltCpbRemovalDelayOffset parameter, which is used to correct the decoding delay, equal to twice the number of TFD pictures that immediately follow the CRA picture.

For each picture, the encoding control unit 12 signals the coding mode and the header information of the picture to the picture encoding unit 13, and issues an instruction to encode the picture.

The picture encoding unit 13, in response to the instruction from the encoding control unit 12, encodes the picture with the specified coding mode by employing one of video coding methods capable of inter-frame predictive coding. The video coding method that the picture encoding unit 13 employs may be, for example, MPEG-4 AVC/H.264 or MPEG-2. The picture encoding unit 13 stores the encoded video data, containing each encoded picture, in a storage unit (not depicted).

Next, an editing process performed when splicing two encoded video data streams will be described. The editing process is carried out using the splicing point identification information processing unit 14 and the data splicing unit 15.

The splicing point identification information processing unit 14 reads out from a storage unit (not depicted) the two encoded video data streams selected, for example, via a user interface unit not depicted. Then, in accordance with an externally applied control signal not depicted, the splicing point identification information processing unit 14 identifies the splicing point starting picture in the second encoded video data stream to be spliced temporally downstream of the other one of the encoded video data streams. The external control signal specifies, for example, the number of encoded pictures from the beginning of the second encoded video data stream, and the splicing point identification information processing unit 14 takes, for example, the latest CRA picture within this number of encoded pictures as the splicing point picture.

For the splicing point CRA picture identified, if the NalUnitType of the slice of that picture is 4, the splicing point identification information processing unit 14 changes the value of the NalUnitType to 7 which indicates that the picture is a BLA picture that is not immediately followed by a TFD picture. Further, the splicing point identification information processing unit 14 supplies the splicing point CRA picture and its subsequent pictures in the second encoded video data stream to the data splicing unit 15, and at the same time, issues an instruction to discard the TFD picture immediately following the splicing point CRA picture.

On the other hand, for the splicing point CRA picture identified, if the NalUnitType of the slice of that picture is 5, the splicing point identification information processing unit 14 changes the value of the NalUnitType to 7 which indicates that the picture is a BLA picture that is not immediately followed by a TFD picture. Further, the splicing point identification information processing unit 14 supplies the splicing point CRA picture and its subsequent pictures in the second encoded video data stream to the data splicing unit 15. However, in this case, the splicing point identification information processing unit 14 does not issue an instruction to discard the TFD picture immediately following the splicing point CRA picture.

The data splicing unit 15 receives the second encoded video data stream from the splicing point identification information processing unit 14, and splices it to the trailing end of the first encoded video data stream that is spliced temporally upstream of the splicing point. At this time, the data splicing unit 15 discards from the second encoded video data stream any TFD picture that immediately follows the starting picture thereof and that is unable to be reproduced correctly. Then, the data splicing unit 15 stores in the storage unit (not depicted) the spliced encoded video data created by splicing together the first and second encoded video data streams.

Figure 6:
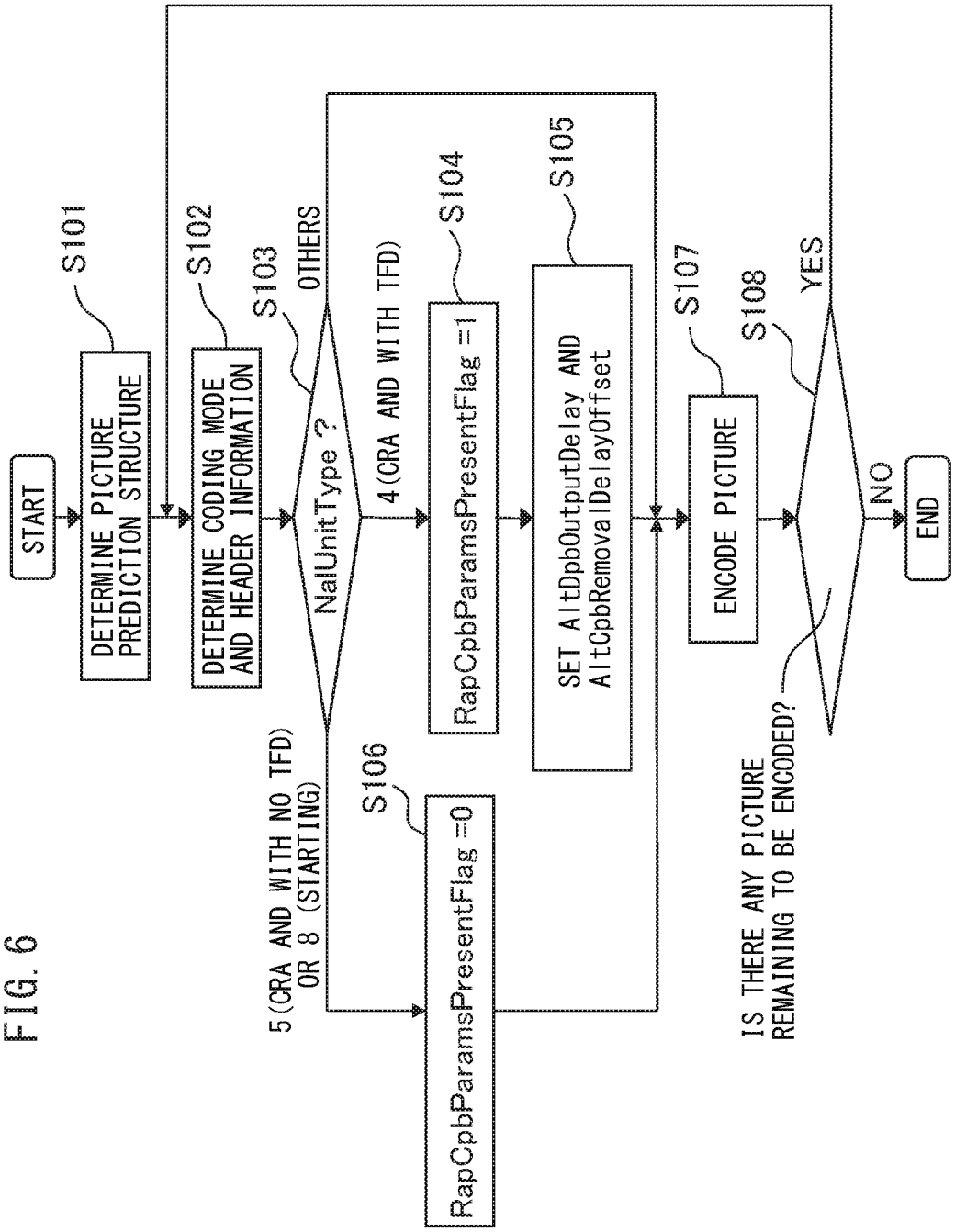
FIG. 6 is an operation flowchart of a video encoding process according to the first embodiment.

FIG. 6 is an operation flowchart illustrating the video encoding process performed by the video encoding apparatus according to the first embodiment. The video encoding apparatus 1 encodes the entire video sequence to be encoded in accordance with the operation flowchart of FIG. 6.

Before starting the encoding process for the entire sequence, the picture prediction structure such as the GOP structure is determined, for example, by the control unit 11 (step S101). The picture prediction structure determined is signaled to the encoding control unit 12.

Then, based on the picture prediction structure, the position of the target picture from the beginning of the video data, etc., the encoding control unit 12 determines the coding mode to be applied to encode the target picture, and generates the header information of the target picture to be encoded (step S102).

Next, the encoding control unit 12 determines whether NalUnitType in the slice NUH of the target picture is either 4 or 5 or 8, or none of them (step S103). When NalUnitType is 4, the target picture is a CRA picture which is followed by a TFD picture. When the encoded video data stream containing this target picture as the starting picture is spliced on the downstream side of another encoded video data stream, there arises a need to correct the decoding delay and display delay values of this target picture and its subsequent pictures during the video decoding process. Therefore, the encoding control unit 12 sets RapCpbParamsPresentFlag in the BPSEI appended to this target picture to 1 (step S104). Then, the encoding control unit 12 sets the value of the display delay correction information AltDpbOutputDelay, which is used to correct the display delay, equal to twice the number of pictures to be reordered. Further, the encoding control unit 12 sets the value of the decoding delay correction information AltCpbRemovalDelayOffset, which is used to correct the decoding delay, equal to twice the number of TFD pictures that immediately follow the CRA picture (step S105).

On the other hand, when NalUnitType is 5 or 8, the target picture is a BPSEI-appended picture, but this target picture is not followed by a TFD picture. Therefore, the encoding control unit 12 sets RapCpbParamsPresentFlag in the BPSEI appended to this target picture to 0 (step S106). When NalUnitType is neither 4 nor 5 nor 8, this target picture is not a BPSEI-appended picture. Accordingly, the encoding control unit 12 does not set RapCpbParamsPresentFlag.

After step S105 or S106, or if NalUnitType is neither 4 nor 5 in step S103, the encoding control unit 12 supplies the data of the target picture to the picture encoding unit 13 along with the type of the coding mode and the header information of that picture. Then, the picture encoding unit 13 encodes the target picture in accordance with the coding mode and the header information, and appends the header information to the data of the encoded picture (step S107).

After that, the control unit 11 determines whether there is any picture remaining to be encoded in the video sequence (step S108). If there is any picture remaining to be encoded (Yes in step S108), the control unit 11 carries out the process from step S102 onward to encode the next target picture. On the other hand, if there is no longer any picture remaining to be encoded (No in step S108), the control unit 11 terminates the encoding process.

Figure 7:
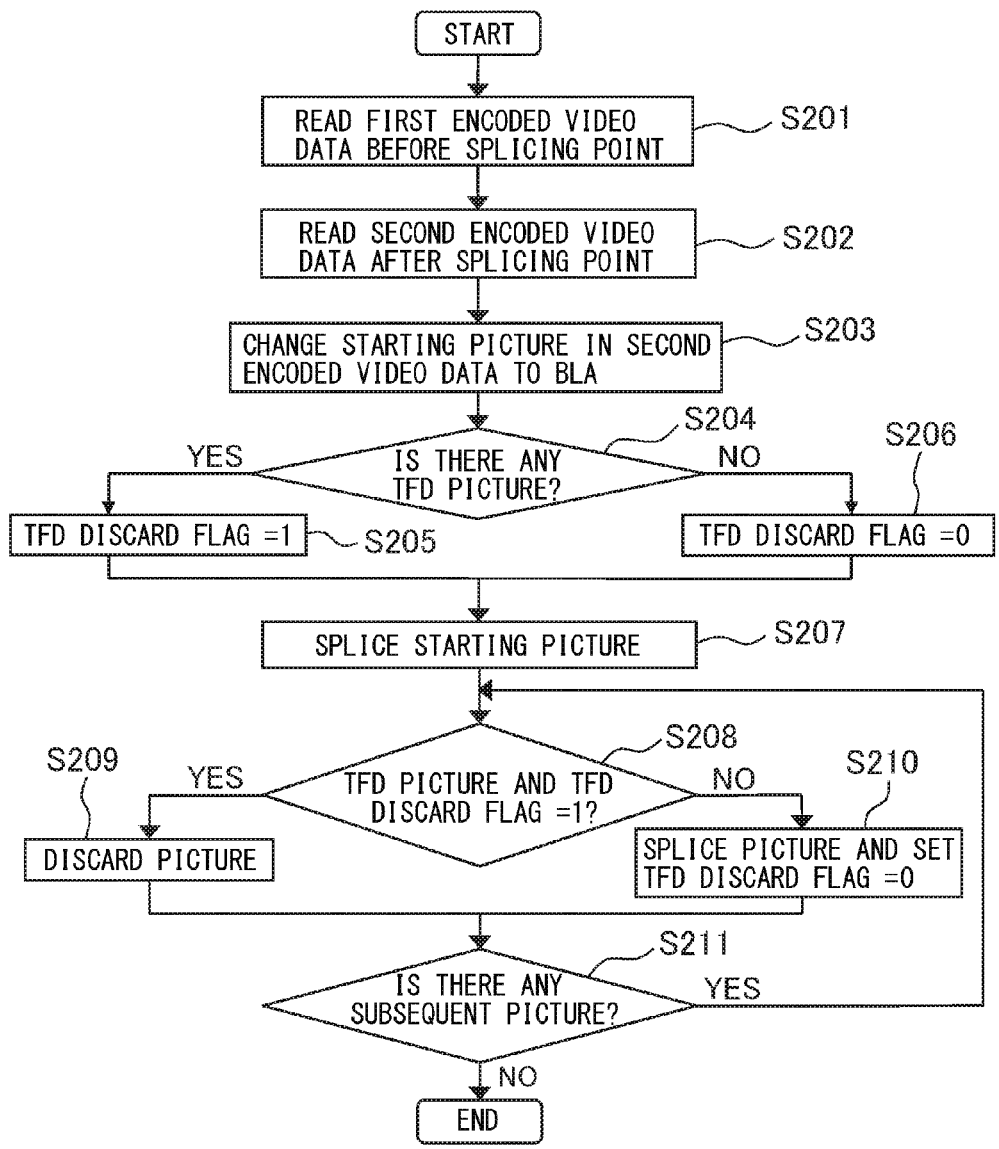
FIG. 7 is an operation flowchart of a video editing process according to the first embodiment.

FIG. 7 is an operation flowchart illustrating the video editing process performed by the video encoding apparatus according to the first embodiment.

The splicing point identification information processing unit 14 sequentially reads out from the storage unit (not depicted) the encoded pictures up to the splicing point out of the first encoded video data stream to be spliced upstream of the splicing point (step S201). Further, the splicing point identification information processing unit 14 sequentially reads out from the storage unit (not depicted) the encoded pictures after the splicing point out of the second encoded video data stream to be spliced downstream of the splicing point (step S202). Next, for the starting CRA picture read out of the second encoded video data stream, the splicing point identification information processing unit 14 changes the value of NalUnitType in each slice NUH to the value that indicates a BLA picture, and supplies the starting CRA picture to the data splicing unit 15 (step S203). Further, the splicing point identification information processing unit 14 determines whether the original value of NalUnitType is 4 or not, i.e., whether there is any TFD picture or not (step S204). If the original value of NalUnitType is 4 (Yes in step S204), there is a TFD picture that follows the starting CRA picture (which is a BLA picture after splicing). Therefore, the splicing point identification information processing unit 14 sets a TFD discard flag to 1 (step S205). On the other hand, if the original value of NalUnitType is not 4 (No in step S204), there is no TFD picture that follows the starting CRA picture. Therefore, the splicing point identification information processing unit 14 sets the TFD discard flag to 0 (step S206).

After step S205 or S206, the splicing point identification information processing unit 14 supplies the starting CRA picture and its subsequent pictures of the second encoded video data stream to the data splicing unit 15. Then, the data splicing unit 15 splices the starting CRA picture, i.e., the BLA picture, on the downstream side of the splicing point of the first encoded video data stream (step S207).

After that, the data splicing unit 15 proceeds to the next target picture in the second encoded video data stream that follows the picture spliced to the first encoded video data stream or that follows the discarded picture. Then, the data splicing unit 15 determines whether NalUnitType in each slice NUH of this target picture is 2 or not (i.e., whether the picture is a TFD picture or not) and whether the TFD discard flag is 1 or not (step S208).

If NalUnitType is 2, and if the TFD discard flag is 1 (Yes in step S208), the data splicing unit 15 discards this target picture (step S209). On the other hand, if NalUnitType is not 2, or if the TFD discard flag is 0 (No in step S208), the data splicing unit 15 adds this target picture at the trailing end of the spliced encoded video data, and sets the TFD discard flag to 0 (step S210).

After step S209 or S210, the data splicing unit 15 determines whether there is any further picture subsequent to the target picture (step S211). If there is any further subsequent picture (Yes in step S211), the data splicing unit 15 returns to step S208 to repeat the above process. On the other hand, if there is no further subsequent picture (No in step S211), the data splicing unit 15 terminates the video editing process.

Next, a description will be given of the video decoding apparatus for decoding the encoded video data encoded or edited by the video encoding apparatus 1 according to the first embodiment.

Figure 8:
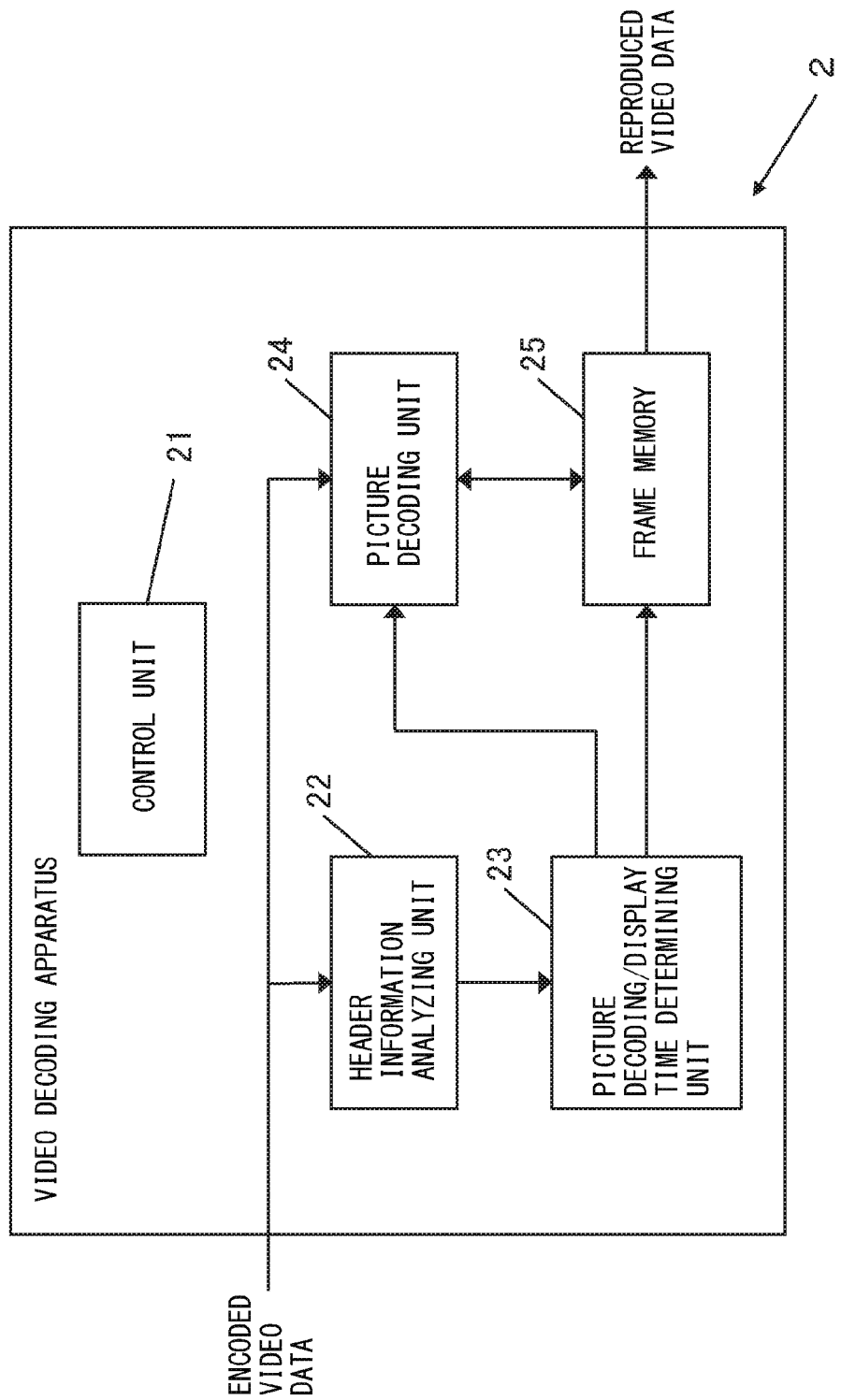
FIG. 8 is a simplified block diagram of a video decoding apparatus according to the first embodiment.

FIG. 8 is a simplified block diagram of the video decoding apparatus according to the first embodiment. The video decoding apparatus 2 includes a control unit 21, a header information analyzing unit 22, a picture decoding/display time determining unit 23, a picture decoding unit 24, and a frame memory 25. These units constituting the video decoding apparatus 2 are each implemented as a separate circuit on the video decoding apparatus 2. Alternatively, these units constituting the video decoding apparatus 2 may be implemented on the video decoding apparatus 2 in the form of a single integrated circuit on which the circuits implementing the functions of the respective units are integrated. Further, these units constituting the video decoding apparatus 2 may be functional modules implemented by executing a computer program on a processor incorporated in the video decoding apparatus 2.

The control unit 21 controls the operation of each designated unit of the video decoding apparatus 2 when decoding the encoded video data.

The header information analyzing unit 22 analyzes the header information of the encoded video data, and passes the parameters necessary for the determination of the picture decoding and display times, for example, NalUnitType of each picture, AltDpbOutputDelay and AltCpbRemovalDelayOffset carried in BPSEI, and CpbRemovalDelay and DpbOutputDelay carried in PTSEI, to the picture decoding/display time determining unit 23.

The picture decoding/display time determining unit 23 that received the parameters from the header information analyzing unit 22 checks the slice NUH of the target picture to be decoded. When the value of NalUnitType carried in the NUH is 6 or 7, the picture decoding/display time determining unit 23 determines that the picture to be decoded is a BLA picture.

When the picture to be decoded is a BLA picture, the picture decoding/display time determining unit 23 uses, as the decoding delay CpbRemovalDelay of the BLA picture, the value calculated in the following manner, not the value of the CpbRemovalDelay carried in the PTSEI appended to the BLA picture.

The picture decoding/display time determining unit 23 counts the number of pictures, A, from the picture that immediately follows the most recent BPSEI-appended picture before the BLA picture up to the picture that immediately precedes the BLA picture. Next, the picture decoding/display time determining unit 23 checks the value B of CpbRemovalDelay carried in the PTSEI appended to the picture immediately preceding the BLA picture. Then, the picture decoding/display time determining unit 23 calculates the value of the decoding delay CpbRemovalDelay of the BLA picture as $A*(B/(A-1))$.

When the picture to be decoded is a BLA picture whose NalUnitType is 7 which indicates that the BLA picture is immediately followed by a TFD picture, the picture decoding/display time determining unit 23 further checks the flag RapCpbParamsPresentFlag in the BPSEI appended to the BLA picture. When the value of RapCpbParamsPresentFlag is 1, the picture decoding/display time determining unit 23 determines that the TFD picture immediately following the BLA picture has been discarded, and corrects the display delay DpbOutputDelay of that BLA picture and the decoding delay CpbRemovalDelay of every subsequent picture from the picture (non-TFD picture) immediately following the BLA picture to the next BPSEI-appended picture in the following manner.

The picture decoding/display time determining unit 23 uses, as the display delay DpbOutputDelay of the BLA picture, the AltDpbOutputDelay carried in the BPSEI appended to the BLA picture, not the DpbOutputDelay carried in the PTSEI appended to the BLA picture. Further, the picture decoding/display time determining unit 23 corrects the decoding delay CpbRemovalDelay of every subsequent picture from the picture immediately following the BLA picture to the next BPSEI-appended picture by subtracting the value of AltCpbRemovalDelayOffset carried in the BPSEI appended to the BLA picture from the value of CpbRemovalDelay carried in the PTSEI appended to the subsequent picture.

For any other picture than the above pictures, the picture decoding/display time determining unit 23 determines the decoding delay CpbRemovalDelay and display delay DpbOutputDelay of the picture by directly taking the values of CpbRemovalDelay and DpbOutputDelay carried in the PTSEI appended to that picture.

The picture decoding/display time determining unit 23 determines the decoding time of each picture based on the above decoding delay CpbRemovalDelay, and issues a decoding instruction to the picture decoding unit 24 at the determined decoding time. Further, the picture decoding/display time determining unit 23 determines the display time of each picture based on the above display delay DpbOutputDelay, and issues a display instruction to the frame memory 25 at the determined display time.

Upon receiving the decoding instruction for the target picture, the picture decoding unit 24 decodes the target picture by using a reference picture stored in the frame memory 25. Then, the picture decoding unit 24 stores the decoded picture in the frame memory 25. The picture decoding unit 24 performs the decoding by employing the same coding method as that employed by the picture encoding unit in the video encoding apparatus 1.

The frame memory 25 stores the decoded picture. Further, the frame memory 25 outputs the decoded picture to the picture decoding unit 24 to present a reference picture to a picture to be decoded subsequently. The frame memory 25 also outputs the decoded picture to a display unit (not depicted) in accordance with the display instruction received from the picture decoding/display time determining unit 23.

Figure 9:
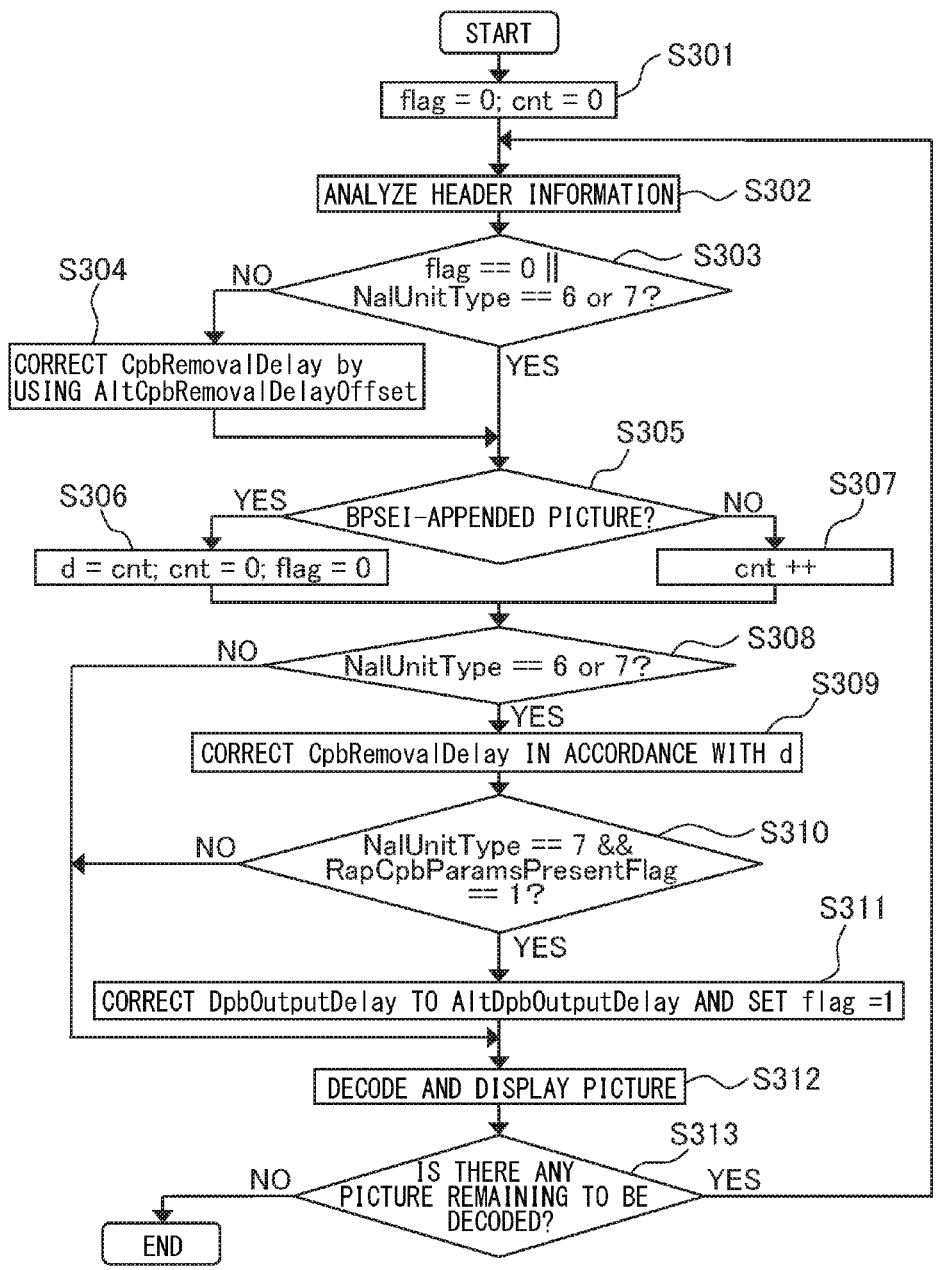
FIG. 9 is an operation flowchart of a video decoding process according to the first embodiment.

FIG. 9 is an operation flowchart illustrating the video decoding process performed by the video decoding apparatus according to the first embodiment. The video decoding apparatus 2 decodes the entire video sequence to be decoded in accordance with the operation flowchart of FIG. 9.

Before starting the decoding process for the entire sequence, the control unit 21 initializes variables "cnt" and "flag" to 0 (step S301). The variable "cnt" represents the number of pictures from the BPSEI-appended picture to the next BPSEI-appended picture. The variable "flag" is a variable that indicates whether the picture is a non-BLA picture whose CpbRemovalDelay needs correcting.

Next, the header information analyzing unit 22 analyzes the header information of the target picture to be decoded, and passes the parameters necessary for determining the display time to the picture decoding/display time determining unit 23 (step S302). The picture decoding/display time determining unit 23 determines whether the variable "flag" is 0 or not, or whether the value of NalUnitType in the slice header NUH of the picture to be decoded is either 6 or 7, i.e., whether the picture to be decoded is a BLA picture or not (step S303). If the variable flag is 1, and if the value of NalUnitType in the slice header NUH of the picture to be decoded is neither 6 nor 7 (No in step S303), the picture decoding/display time determining unit 23 corrects the decoding delay CpbRemovalDelay of the picture to be decoded, which is, in this case, a non-BLA picture, by using the decoding delay correction information AltCpbRemovalDelayOffset (step S304).

After step S304, or if it is determined in step S303 that the variable "flag" is 0 or NalUnitType is either 6 or 7 (Yes in step S303), the picture decoding/display time determining unit 23 determines whether the picture to be decoded is a BPSEI-appended picture or not (step S305).

If the picture to be decoded is a BPSEI-appended picture (Yes in step S305), the picture decoding/display time determining unit 23 copies the value of the variable "cnt" to a variable "d", and resets both variables "cnt" and "flag" to 0 (step S306). If the picture to be decoded is not a BPSEI-appended picture (No in step S305), the picture decoding/display time determining unit 23 increments the value of the variable "cnt" by 1 (step S307).

After step S306 or S307, the picture decoding/display time determining unit 23 determines whether the value of NalUnitType in the slice header NUH of the picture to be decoded is either 6 or 7 (step S308). If the value of NalUnitType in the slice header NUH of the picture to be decoded is either 6 or 7 (Yes in step S308), the picture to be decoded is a BLA picture. Then, the picture decoding/display time determining unit 23 corrects the decoding delay CpbRemovalDelay of the picture in accordance with the value of the variable "d" (step S309).

Next, the picture decoding/display time determining unit 23 determines whether the value of NalUnitType in the slice header NUH of the picture to be decoded is 7 and whether the value of RapCpbParamsPresentFlag in the BPSEI appended to the picture to be decoded is 1 (step S310). If the value of NalUnitType in the slice header NUH of the picture to be decoded is 7, and if the value of RapCpbParamsPresentFlag in the BPSEI appended to the picture to be decoded is 1 (Yes in step S310), the picture decoding/display time determining unit 23 sets the variable "flag" to 1, while correcting the display delay DpbOutputDelay of the BLA picture to the display delay correction information AltDpbOutputDelay (step S311).

After step S311, or if it is determined in step S308 that the value of NalUnitType in the slice header NUH of the picture to be decoded is neither 6 nor 7 (No in step S308), or if it is determined in step S310 that the value of NalUnitType in the slice header NUH of the picture to be decoded is not 7 and that the value of RapCpbParamsPresentFlag in the BPSEI appended to the picture to be decoded is 0 (No in step S310), the picture decoding/display time determining unit 23 issues the decoding instruction to the picture decoding unit 24 at the determined decoding time. Further, the picture decoding/display time determining unit 23 issues the display instruction to the frame memory 25 at the determined display time. Then, the picture decoding unit 24 decodes the target picture at the decoding time. On the other hand, the frame memory 25 displays the decoded picture on the display unit (not depicted) (step S312).

The control unit 21 determines whether there is any picture remaining to be decoded in the encoded video data (step S313). If there is any picture remaining to be decoded (Yes in step S313), the control unit 21 returns the process to step S302. Then, the picture to be decoded next in the decoding order is taken as the target picture, and the process starting from step S302 is repeated. On the other hand, if there is no longer any picture remaining to be decoded (No in step S313), the control unit 21 terminates the video decoding process.

As has been described above, even when two or more encoded video data streams are spliced together without decoding them, the video encoding apparatus according to the present embodiment need not correct the decoding delay and display delay parameters determined at the time of encoding. Then, since the decoding delay and display delay of each picture can be corrected using the decoding delay correction and display delay correction parameters added at the time of splicing the encoded video data streams, the video decoding apparatus according to the present embodiment can decode and display each picture at correct timing.

Next, a second embodiment will be described. The second embodiment differs from the first embodiment in the structure of the encoded video data.

Figure 10:
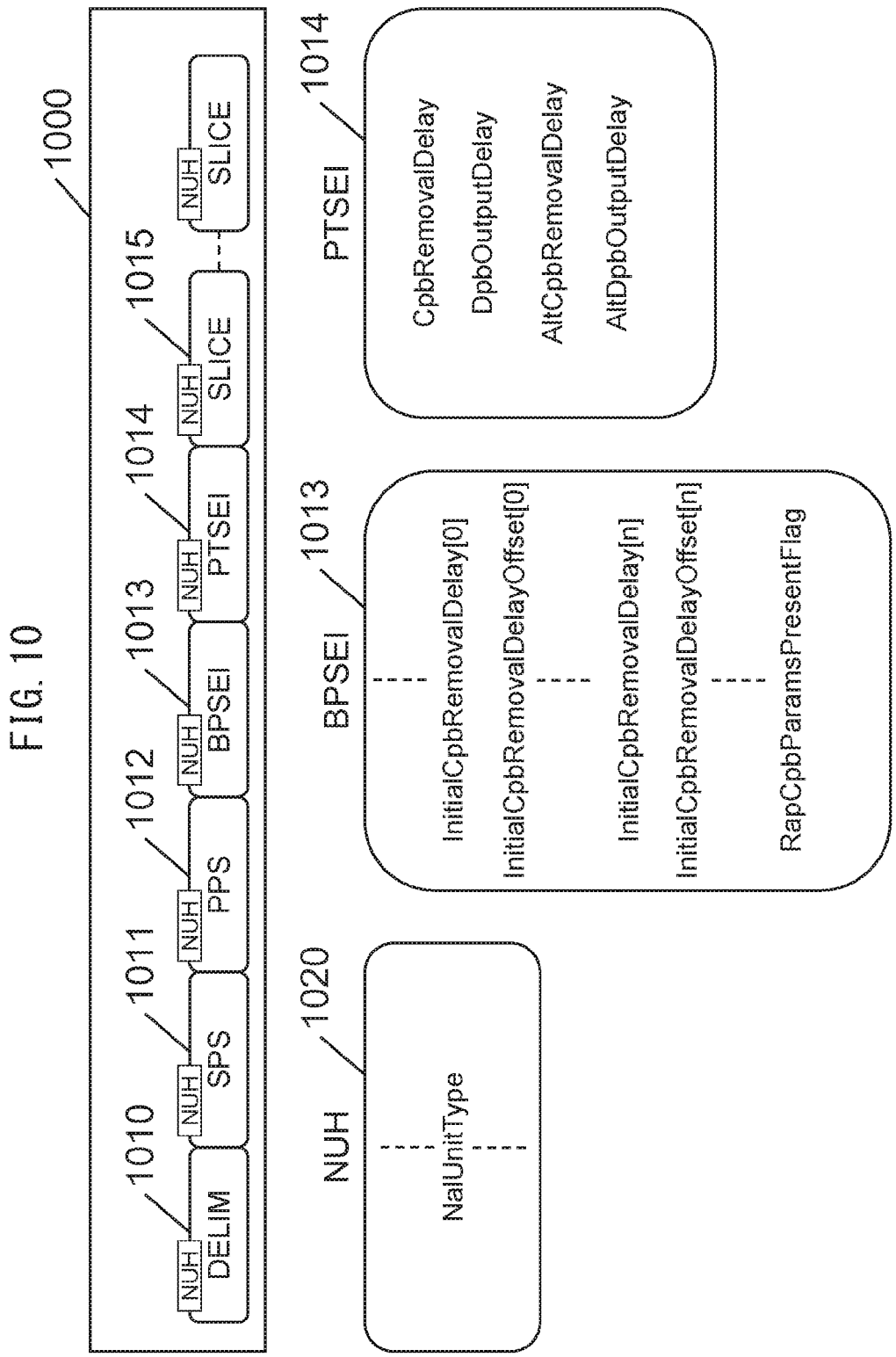
FIG. 10 is a diagram for explaining the data structure of one picture in encoded video according to a second embodiment.

Referring to FIG. 10, the structure of the encoded video data according to the second embodiment will be described. In common with the encoded picture structure according to the first embodiment depicted in FIG. 4, the data structure 1000 of one picture contains six kinds of NAL units 1010 to 1015. Of these, the BPSEI 1013 and PTSEI 1014 are different from the BPSEI 413 and PTSEI 414 depicted in FIG. 4. On the other hand, the DELIM 1010, SPS 1011, PPS 1012, SLICE 1015, and NUH 1020 are identical to the DELIM 410, SPS 411, PPS 412, SLICE 415, and NUH 420, respectively, depicted in FIG. 4.

The BPSEI 1013, like the BPSEI 413, contains a number, (N+1), of InitialCpbRemovalDelay and InitialCpbRemovalDelayOffset fields, and the RapCpbParamsPresentFlag field that follows them. However, the AltCpbRemovalDelay field and the AltDpbOutputDelay field are not contained in the BPSEI 1013. On the other hand, the PTSEI 1014, like the PTSEI 414, contains the CpbRemovalDelay field and the DpbOutputDelay field. When the value of RapCpbParamsPresentFlag in the BPSEI is 1, the PTSEI 1014 further contains the AltCpbRemovalDelay field and the AltDpbOutputDelay field.

If CpbRemovalDelay or DpbOutputDelay in the PTSEI of a certain picture does not change even when TFD pictures are discarded, the value of AltCpbRemovalDelay or AltDpbOutputDelay is set to be the same as the value of CpbRemovalDelay or DpbOutputDelay.

As described above, the difference from the first embodiment lies in the type of SEI that carries the AltCpbRemovalDelay and AltDpbOutputDelay fields. Therefore, the video encoding apparatus of the second embodiment differs from the video encoding apparatus of the first embodiment in the operation of the encoding control unit 12. The following therefore describes the operation of the encoding control unit 12.

The encoding control unit 12 stores the AltCpbRemovalDelay and AltDpbOutputDelay fields in the PTSEI appended to each picture, not in the BPSEI. In this case, the encoding control unit 12 performs control so that the values of the decoding delay and display delay of each picture when two encoded video data streams are spliced are stored in the AltCpbRemovalDelay and AltDpbOutputDelay fields, respectively.

Next, the operation of the video decoding apparatus according to the second embodiment will be described. The configuration of the video decoding apparatus according to the second embodiment is essentially the same as that of the video decoding apparatus according to the first embodiment. However, the video decoding apparatus of the second embodiment differs from that of the first embodiment in the operation of the picture decoding/display time determining unit 23. The following therefore describes the operation of the picture decoding/display time determining unit 23.

When the picture to be decoded is a BLA picture whose NalUnitType is 7, the picture decoding/display time determining unit 23 further checks RapCpbParamsPresentFlag in the BPSEI. When the value of RapCpbParamsPresentFlag is 1, the picture decoding/display time determining unit 23 determines that the TFD picture immediately following the BLA picture has been discarded. Then, the picture decoding/display time determining unit 23 corrects the DpbOutputDelay of the BLA picture and the CpbRemovalDelay of every picture from the picture (non-TFD picture) immediately following the BLA picture to the next BPSEI-appended picture in the following manner.

The picture decoding/display time determining unit 23 uses, as the DpbOutputDelay of the BLA picture, the AltDpbOutputDelay carried in the PTSEI appended to the BLA picture, not the DpbOutputDelay carried in the PTSEI appended to the BLA picture.

Further, the picture decoding/display time determining unit 23 uses, as the CpbRemovalDelay of every picture from the picture immediately following the BLA picture to the next BPSEI-appended picture, the AltCpbRemovalDelayOffset contained in the PTSEI appended to the picture, not the CpbRemovalDelay carried in the PTSEI appended to the picture.

Next, a third embodiment will be described. The third embodiment differs from the first embodiment in the way the picture decoding/display time determining unit 23 in the video decoding apparatus calculates the decoding delay of the BLA picture. The following therefore describes the picture decoding/display time determining unit 23.

The picture decoding/display time determining unit 23 checks the slice NUH when analyzing the header information of the target picture passed from the header information analyzing unit 22. When the value of NalUnitType carried in the NUH is 6 or 7, the picture decoding/display time determining unit 23 determines that the target picture to be decoded is a BLA picture.

When the picture to be decoded is a BLA picture, the picture decoding/display time determining unit 23 uses, as the CpbRemovalDelay of the BLA picture, the value calculated in the following manner, not the value of the CpbRemovalDelay carried in the PTSEI appended to the BLA picture.

Let A denote the number of pictures counted from the picture that immediately follows the most recent BPSEI-appended picture (hereinafter referred to as the Pic1) before the BLA picture (hereinafter referred to as the Pic2) up to the picture that immediately precedes the Pic2. From the value B of CpbRemovalDelay of the Pic2, the picture decoding/display time determining unit 23 derives a first correction value Mod1 as A*(B/(A−1)). B/(A−1) corresponds to the time difference between successive pictures (the unit is tc). B/(A−1) will hereinafter be designated as "s".

Next, the picture decoding/display time determining unit 23 calculates a second correction value Mod2 for correcting the disparity in the amount of data held in the CPB at the splicing point. Let Pos2 denote the amount of data held in the CPB just before decoding the Pic2, more specifically, the amount of data held in the CPB when the time [sec] calculated by dividing the value of InitialCpbRemovalDelay (denoted as Init2) carried in the BPSEI appended to the Pic2 by 90000 (i.e., 90 kHz) has elapsed from time 0 at which the first bit of the encoded video data stream with the Pic2 as the starting picture arrived at the receive buffer in the video decoding apparatus; then, Pos2 is calculated as (R*Init2/90000). R denotes the bit rate.

On the other hand, let Init1 denote the value of InitialCpbRemovalDelay carried in the BPSEI appended to the Pic1, and TotalB the total amount of code of all the pictures located between the Pic1 and Pic2, including the Pic1; then, the amount of data, Pos2, held in the CPB just before decoding the Pic2 when the video decoding apparatus decodes the encoded video data from the beginning thereof is calculated as (R*(Init1+(A+1)*s)−TotalB).

When Pos1 is smaller than Pos2, all the data of the Pic2 have not arrived at the video decoding apparatus by the time the decoding apparatus just begins to decode the Pic2 in the encoded video data stream, and therefore, the Pic1 may not be able to be decoded. This can be avoided by delaying the decoding time of the Pic2 in units of (s*tc) time [sec].

When (Pos2−Pos1)<Th, the picture decoding/display time determining unit 23 sets the second correction value Mod2 to 0. The threshold Th has a positive value. The picture decoding/display time determining unit 23 otherwise sets the second correction value Mod2 to (Ceil((Pos2−Pos1)/R/(s*tc))). Ceil( ) is the ceiling function. When the picture to be decoded is a BLA picture, the picture decoding/display time determining unit 23 replaces the CpbRemovalDelay of the BLA picture by (Mod1+Mod2).

In this way, the video decoding apparatus according to the third embodiment determines the decoding delay of the BLA picture by considering the amount of data held in the CPB just before decoding the BLA picture. As a result, the video decoding apparatus according to this embodiment can prevent underflow from occurring in the CPB.

Next, a fourth embodiment will be described. In the fourth embodiment, the decoding delay and display delay can be appropriately determined even when the number of pictures to be reordered in the first encoded video data stream spliced upstream of the splicing point is different from the number of pictures to be reordered in the second encoded video data stream spliced downstream of the splicing point. Further, in the fourth embodiment, the decoding delay and display delay can be appropriately determined even when any picture to be displayed before the splicing point in the first encoded video data stream has been discarded.

Figure 11:
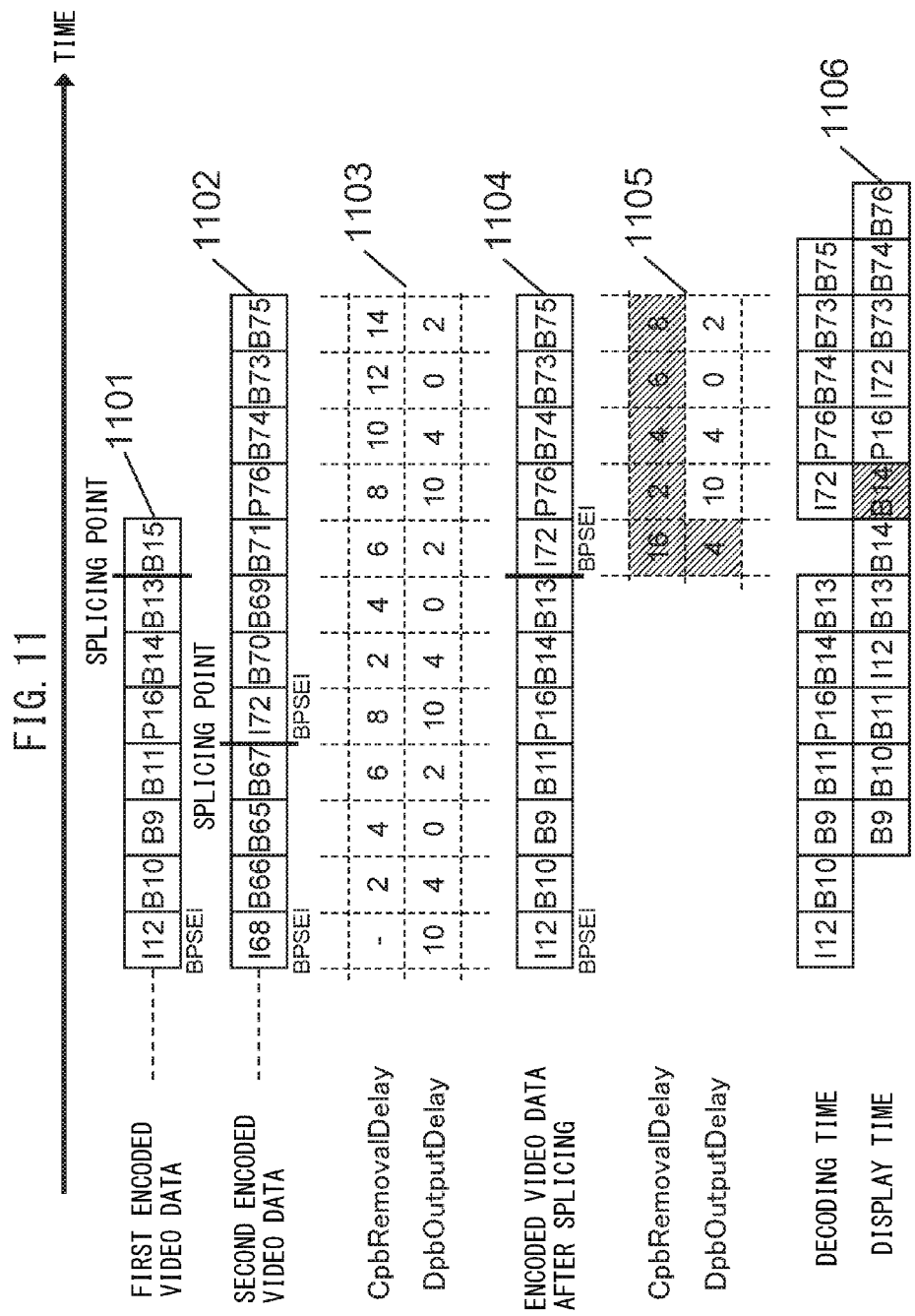
FIG. 11 is a diagram for explaining the decoding delay and display delay values of the pictures after the splicing point when two encoded video data streams are spliced and when pictures preceding the splicing point in display order have been discarded in the encoded video data stream spliced upstream of the splicing point.
Figure 12:
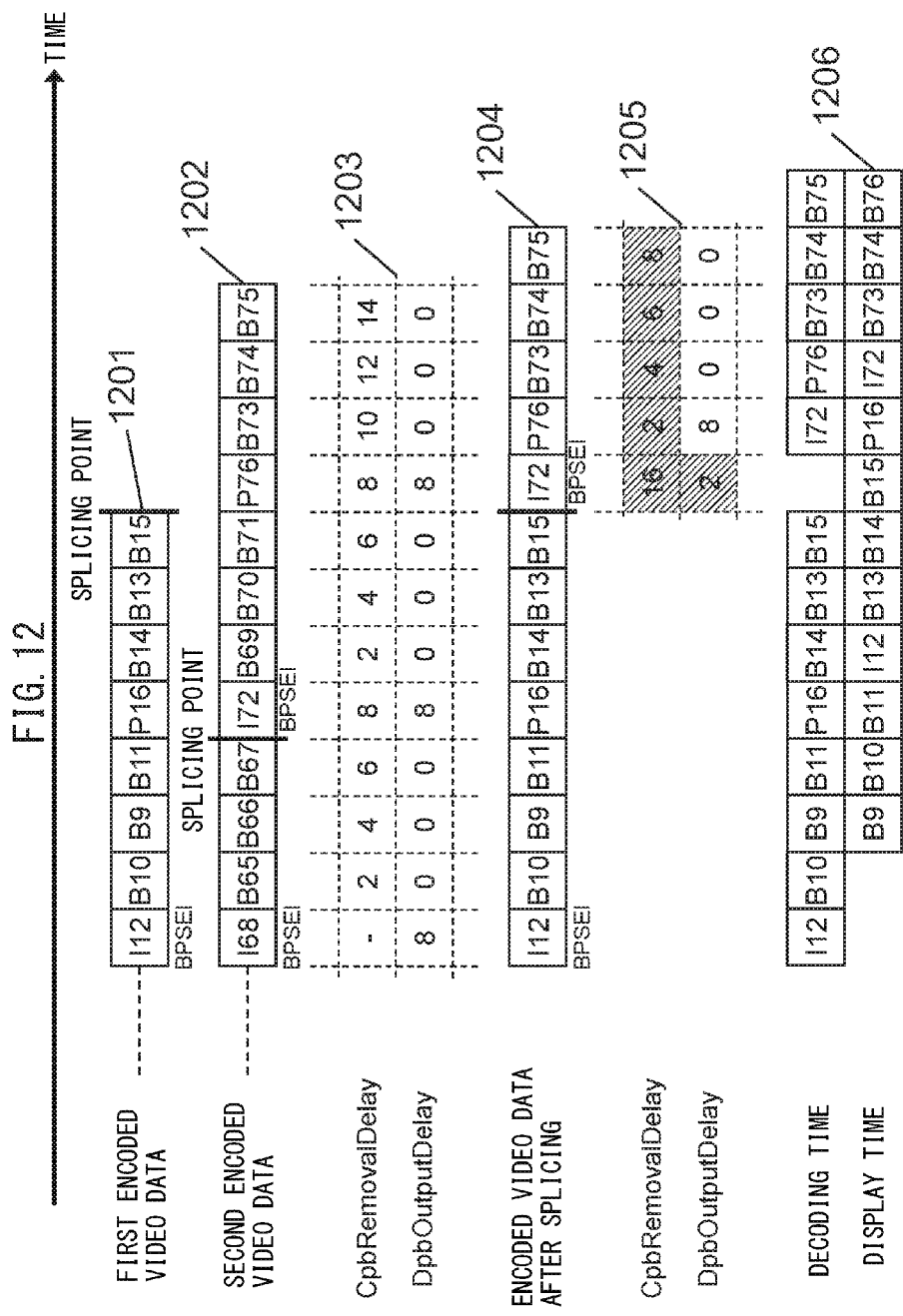
FIG. 12 is a diagram for explaining the decoding delay and display delay values of the pictures after the splicing point when the number of pictures to be reordered in the encoded video data stream spliced downstream of the splicing point is smaller than the number of pictures to be reordered in the encoded video data stream spliced upstream of the splicing point.
Figure 13:
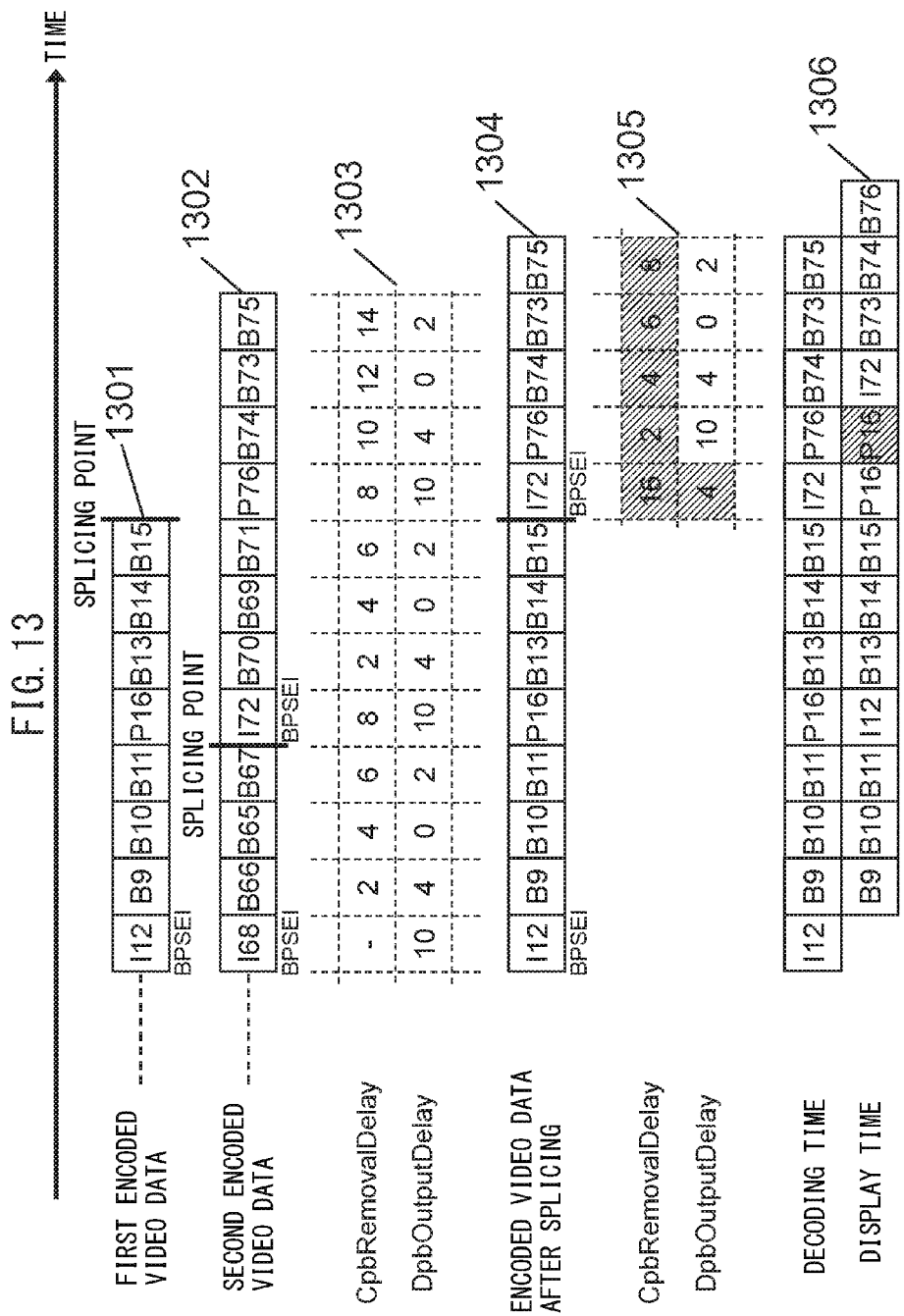
FIG. 13 is a diagram for explaining the decoding delay and display delay values of the pictures after the splicing point when the number of pictures to be reordered in the encoded video data stream spliced upstream of the splicing point is smaller than the number of pictures to be reordered in the encoded video data stream spliced downstream of the splicing point.

Referring to FIGS. 11 to 13, an explanation will be given of the values of the picture decoding delay CpbRemovalDelay and display delay DpbOutputDelay for different picture encoding structures and different editing points.

Figure 3:
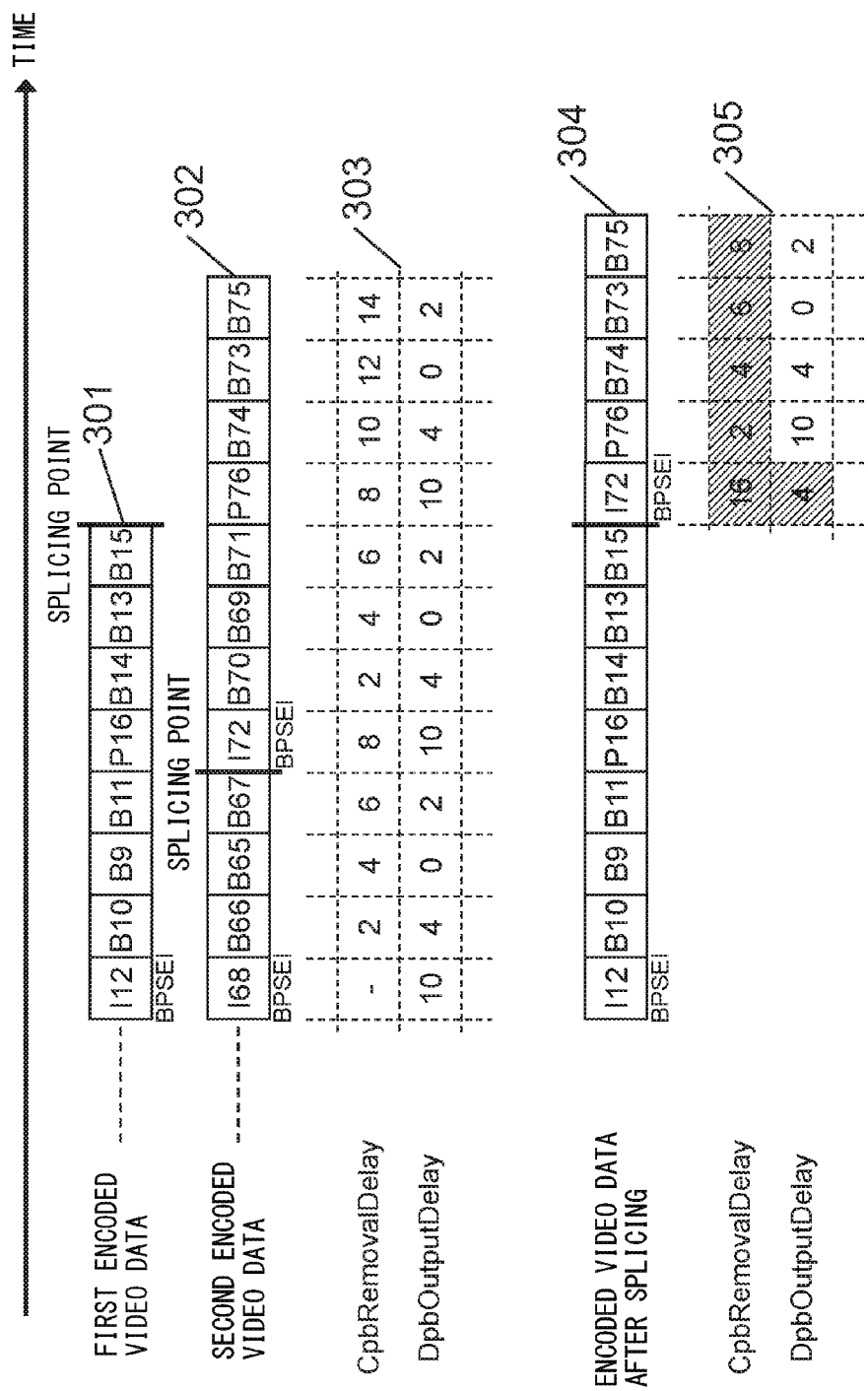
FIG. 3 is a diagram for explaining the decoding delay and display delay values of the pictures after the splicing point when two encoded video data streams are spliced.

In FIG. 11, the number of pictures to be reordered in the first encoded video data stream and that in the second encoded video data stream are both 2, as in the case of FIG. 3. Further, the first and second encoded video data streams 1101 and 1102 are the same as the first and second encoded video data streams 301 and 302 depicted in FIG. 3. The block array 1103 indicating the decoding delay and display delay values for the second encoded video data stream 1102 is also the same as the block array 303 depicted in FIG. 3. However, unlike FIG. 3, the picture B13 in the first encoded video data stream 1101 is the splicing point picture.

As a result, unlike the spliced encoded video data 304, the picture B15 is not contained in the spliced encoded video data 1104.

The block array 1105 indicates the values of the decoding delay CpbRemovalDelay and display delay DpbOutputDelay that the pictures I72, P76, B74, B73, and B75 in the spliced encoded video data 1104 are supposed to have. Each block in the upper row of the block array 1105 carries the value of the decoding delay CpbRemovalDelay for the corresponding picture in the spliced encoded video data 1104 located directly above that block. Likewise, each block in the lower row of the block array 1105 carries the value of the display delay DpbOutputDelay for the corresponding picture in the spliced encoded video data 1104 located directly above that block. As can be seen from the block array 1105, even when the picture I72 is spliced so as to follow the picture B13, the decoding delay and display delay values for the pictures I72, P76, B74, B73, and B75 are the same as when the picture I72 is spliced so as to follow the picture B15.

Compared with FIG. 3, the number of pictures located between the picture I72 and the most recent BPSEI-appended picture I12 before it is 6, which is smaller by 1 than the number of pictures located between the pictures I72 and I12 in FIG. 3. However, the value of CpbRemovalDelay needs to be set to 16, as in the case of FIG. 3, in order to completely display the decoded pictures at the same intervals and in the same order that the pictures were input.

The reason will be described by referring to a block array 1106. The block array 1106 indicates the pictures in the spliced encoded video data in decoding time order and in display time order. As depicted in the block array 1106, the spliced encoded video data does not contain the picture B15, but the picture P16 needs to be displayed two picture times after the picture B14. If the picture I72 and the subsequent pictures are to be display successively after displaying the picture P16, the decoding time of the picture I72 has to be delayed by one picture time. In this case, since the picture B14 is displayed for a duration of two picture times, a display freeze occurs.

In the example illustrated in FIG. 12, the number of pictures to be reordered in the second encoded video data stream 1202 is smaller than the number of pictures to be reordered in the first encoded video data stream 1201. In the illustrated example, the number of pictures to be reordered in the first encoded video data stream is 2, while the number of pictures to be reordered in the second encoded video data stream is 1. A block array 1203 indicates the decoding delay CpbRemovalDelay and display delay DpbOutputDelay for each picture in the second encoded video data stream before splicing.

Suppose that the picture I72 in the second encoded video data stream 1202 is spliced so as to follow the picture B15 in the first encoded video data stream 1201, as depicted in the sliced encode video data 1204. In this case, the decoding delay and display delay values of the picture I72 and its subsequent pictures after splicing are as depicted in a block array 1205. A block array 1206 indicates the pictures in the spliced encoded video data in decoding time order and in display time order.

In order to completely display the decoded pictures in succession at the same intervals and in the same order that the pictures were input, the decoding delay of the starting picture in the second encoded video data stream 1202 needs to be increased, as depicted in the block array 1206, in proportion to the difference between the number of pictures to be reordered in the first encoded video data stream 1201 and the number of pictures to be reordered in the second encoded video data stream 1202. In the illustrated example, the decoding delay is increased by 2 to 16.

If the picture chosen to be the splicing point picture in the first encoded video data stream is not the picture B15, but the picture B13, B14, or P16, the decoding delay of the starting picture in the second encoded video data stream is the same as when the second encoded video data stream is spliced so as to follow the picture B15. In this case, however, a picture display freeze occurs for a duration equal to the number of discarded pictures among the pictures preceding the picture P16.

In the example illustrated in FIG. 13, the number of pictures to be reordered in the first encoded video data stream 1301 is smaller than the number of pictures to be reordered in the second encoded video data stream 1302. In the illustrated example, the number of pictures to be reordered in the first encoded video data stream 1301 is 1, while the number of pictures to be reordered in the second encoded video data stream 1302 is 2. A block array 1303 indicates the decoding delay CpbRemovalDelay and display delay DpbOutputDelay for each picture in the second encoded video data stream before splicing.

Suppose that the picture I72 in the second encoded video data stream 1302 is spliced so as to follow the picture B15 in the first encoded video data stream 1301, as depicted in the sliced encode video data 1304. In this case, the decoding delay and display delay values of the picture I72 and its subsequent pictures after splicing are as depicted in a block array 1305. A block array 1306 indicates the pictures in the spliced encoded video data in decoding time order and in display time order.

In order to completely display the decoded pictures at the same intervals and in the same order that the pictures were input, the last display picture in the first encoded video data stream needs to be repeated.

As illustrated in FIGS. 12 and 13, depending on the relationship between the number of pictures to be reordered in the first encoded video data stream and the number of pictures to be reordered in the second encoded video data stream, there may arise a need to delay the decoding time of the starting picture in the second encoded video data stream, or there may occur a display picture freeze across the splicing point. Further, as illustrated in FIG. 11, depending on the position of the splicing point in the first encoded video data stream, a display picture freeze may become unavoidable.

Next, a video decoding apparatus according to a fourth embodiment that addresses the above problem will be described. The video decoding apparatus of the fourth embodiment differs from the video decoding apparatus of the first embodiment in the operation of the picture decoding/display time determining unit 23. The following therefore describes the picture decoding/display time determining unit 23.

The picture decoding/display time determining unit 23 checks the slice NUH when analyzing the header information of the target picture passed from the header information analyzing unit 22. When the value of NalUnitType carried in the NUH is 6 or 7, the picture decoding/display time determining unit 23 determines that the picture to be decoded is a BLA picture.

When the picture to be decoded is a BLA picture, the picture decoding/display time determining unit 23 uses, as the CpbRemovalDelay of the BLA picture, the value calculated in the following manner, not the value of the CpbRemovalDelay carried in the PTSEI appended to the BLA picture.

The picture decoding/display time determining unit 23 counts the number of pictures, A, from the picture that immediately follows the most recent BPSEI-appended picture (hereinafter referred to as the Pic1) before the BLA picture (hereinafter referred to as the Pic2) up to the picture that immediately precedes the Pic2. The picture decoding/display time determining unit 23 checks the value B of CpbRemovalDelay carried in the PTSEI appended to the picture immediately preceding the Pic2, and calculates a first correction value Mod1 of PTSEI as $A*(B/(A-1))$.

Next, the picture decoding/display time determining unit 23 compares the number of pictures to be reordered, R1, which is defined in the SPS that the picture immediately preceding the Pic2 refers to, with the number of pictures to be reordered, R2, that a non-TFD picture immediately following the Pic2 refers to. The field that indicates the number of pictures to be reordered in the SPS is SpsNumReorderPics according to the method disclosed in the non-patent document JCTVC-I1003, "High-Efficiency Video Coding (HEVC) text specification Working Draft 7," Joint Collaborative Team on Video Coding of ITU-T SG16 WP3 and ISO/IEC JTC1/SC29/WG11, May 2012.

When R1 is equal to R2, the picture decoding/display time determining unit 23 uses Mod1 directly as the CpbRemovalDelay of the Pic2. When R2 is larger than R1, the picture decoding/display time determining unit 23 calculates a second correction value Mod2 of PTSEI as $(R2-R1)*B/(A-1)$. When R2 is smaller than R1, the picture decoding/display time determining unit 23 uses Mod1 directly as the CpbRemovalDelay of the Pic2.

Further, the picture decoding/display time determining unit 23 determines, based on the relationship between R1 and R2, whether the last picture in the first encoded video data stream is to be freeze-displayed or not, and signals the determined freeze period to the frame memory 25.

The picture decoding/display time determining unit 23 determines the freeze period (in units of tc) in the following manner. When R1 is equal to R2, or when R1 is larger than R2, the picture decoding/display time determining unit 23 sets the freeze period to 0. On the other hand, when R1 is smaller than R2, the picture decoding/display time determining unit 23 sets the freeze period to $(R2-R1)*B/(A-1)$.

As described above, according to the fourth embodiment, even when the first encoded video data stream spliced upstream of the splicing point contains any picture that is later than the splicing point picture in the encoding (decoding) order and that is to be reproduced earlier than the splicing point picture, the video decoding apparatus can appropriately determine the decoding delay and display delay of each picture located after the splicing point. Furthermore, even when the number of pictures to be reordered differs before and after the splicing point, the video decoding apparatus can appropriately determine the decoding delay and display delay of each picture located after the splicing point.

Next, a fifth embodiment will be described. In the fifth embodiment, the video encoding apparatus adds a parameter for identifying a picture that does not cause a display picture freeze when two encoded video data streams are spliced together.

To prevent a display picture freeze from occurring across the splicing point, the number of pictures to be reordered in the first encoded video data stream has to be made equal to or larger than the number of pictures to be reordered in the second encoded video data stream, and the splicing point of the first encoded video data stream has to be located immediately before a picture that refers only to a temporally preceding picture. In the example of FIG. 11, the splicing point that satisfies this condition is the picture B11 or B15.

Figure 14:
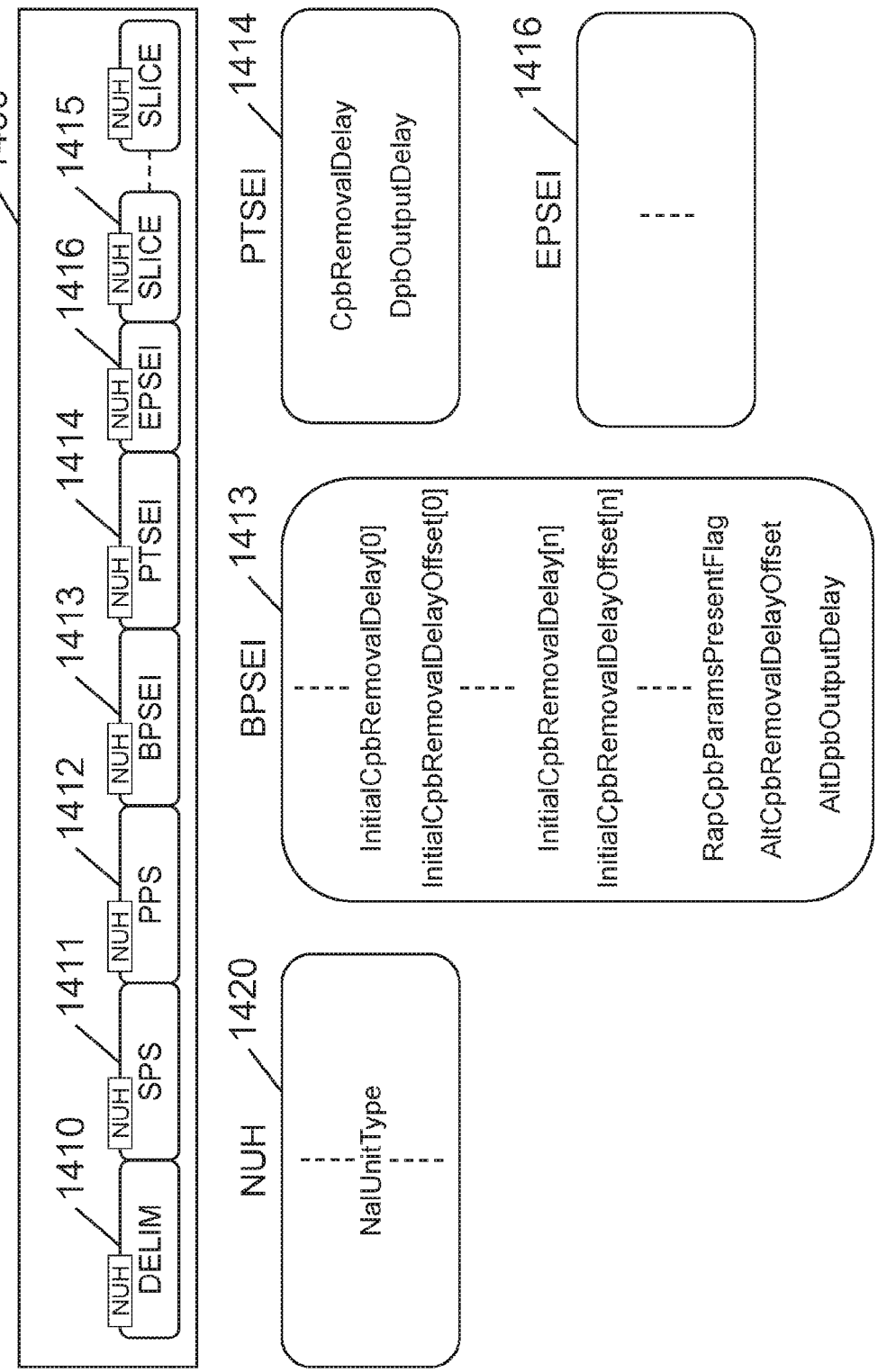
FIG. 14 is a diagram for explaining the data structure of one picture in encoded video according to a fifth embodiment.

FIG. 14 illustrates the data structure of one picture contained in encoded video according to the fifth embodiment. The data structure 1400 of one picture contained in encoded video illustrated in FIG. 14 differs from the data structure 400 illustrated in FIG. 4 by the inclusion of an editing point SEI (EPSEI) NAL unit 1416. The other six NAL units 1410 to 1415 are identical to the corresponding NAL units 410 to 415 of the data structure 400 illustrated in FIG. 4.

The EPSEI NAL unit 1416 is SEI data that indicates a splicing point picture that does not cause a display picture freeze across the splicing point. In the present embodiment, the EPSEI does not include any specific field.

The operation of the video encoding apparatus according to the fifth embodiment will be described below. The video encoding apparatus of the fifth embodiment differs from the video encoding apparatus of the first embodiment in that the encoding control unit 12 and the picture encoding unit 13 append the EPSEI to specific pictures at the time of encoding, and in that the data splicing unit 15 determines the splicing point by referring to the EPSEI at the time of editing. The following therefore describes the operation of the encoding control unit 12 and the picture encoding unit 13 for appending the EPSEI and the operation of the data splicing unit 15 during editing.

At the time of encoding, the encoding control unit 12 instructs the picture encoding unit 13 to append the EPSEI to the picture to be encoded, if the picture is either a picture immediately preceding an I picture or a picture immediately preceding a B picture or P picture that refers only to a picture earlier in display time order. Alternatively, the encoding control unit 12 may instruct the picture encoding unit 13 to append the EPSEI to the picture to be encoded, if the picture is either an I picture or a B picture or P picture that refers only to a picture earlier in display time order.

When an instruction for appending the EPSEI is received from the encoding control unit 12, the picture encoding unit 13 encodes the picture and appends the EPSEI to it.

At the time of editing, the data splicing unit 15 identifies the splicing point picture in the first encoded video data stream in accordance with a control signal from the control unit 11. The control signal includes, for example, the number of encoded pictures counted from the beginning of the first encoded video data stream. The data splicing unit 15 determines the splicing point picture in the first encoded video data stream by selecting the EPSEI-appended picture earliest in encoding order among the applicable picture and the pictures following the applicable picture. Alternatively, the data splicing unit 15 determines the splicing point picture in the first encoded video data stream by selecting the picture immediately preceding the EPSEI-appended picture earliest in encoding order among the applicable picture and the pictures following the applicable picture. Then, the data splicing unit 15 reads out from the storage unit (not depicted) the splicing point picture and all its preceding pictures in the first encoded video data stream. Next, the data splicing unit 15 reads out from the storage unit (not depicted) a portion of the second encoded video data stream supplied from the splicing point identification information processing unit 14, the portion having a splicing point CRA picture as the starting picture. At this time, if an instruction to discard any TFD picture immediately following the splicing point CRA picture is issued from the splicing point identification information processing unit 14, the data splicing unit 15 discard any such TFD picture. The data splicing unit 15 then outputs the readout first encoded video data stream, and thereafter outputs the second encoded video data stream.

As described above, according to the video encoding apparatus of the fifth embodiment, information indicating the picture that does not cause a display freeze when two encoded video data streams are spliced is appended to the encoded video data. As a result, the video encoding apparatus can splice together the two encoded video so as not to cause a display freeze.

Next, a sixth embodiment will be described.

In the video encoding apparatus of the sixth embodiment, the value to be used to obtain the second correction value Mod2 for correcting the disparity in the amount of data held in the CPB at the splicing point, as described in the third embodiment, is appended in advance to the first encoded video data stream.

Figure 15:
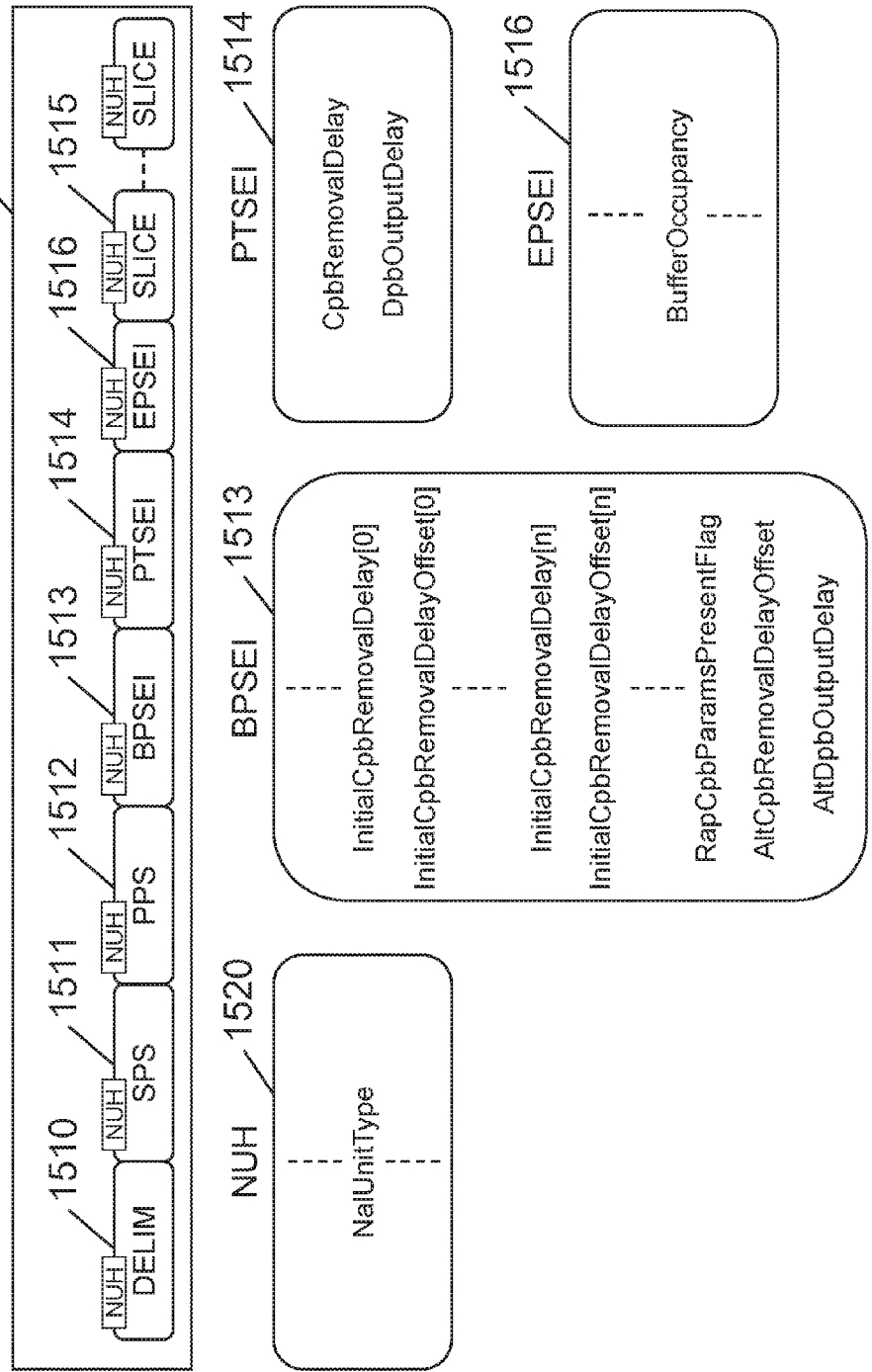
FIG. 15 is a diagram for explaining the data structure of one picture in encoded video according to a sixth embodiment.

FIG. 15 illustrates the data structure of one picture contained in encoded video according to the sixth embodiment. The data structure 1500 illustrated in FIG. 15 differs from the data structure 1400 illustrated in FIG. 14 in that the EPSEI NAL unit 1516 includes a BufferOccupancy field. The other six NAL units 1510 to 1515 are identical to the corresponding NAL units 1410 to 1415 of the data structure 400 illustrated in FIG. 14. The BufferOccupancy field indicates the amount of data held in the CPB just before the splicing point.

The operation of the video encoding apparatus according to the sixth embodiment will be described. The video encoding apparatus of the sixth embodiment differs from the video encoding apparatus of the fifth embodiment in a portion of the operation of the encoding control unit 12. The following therefore describes the portion of the operation of the encoding control unit 12 that differs.

The encoding control unit 12 instructs the picture encoding unit 13 to append the EPSEI to the picture to be encoded, if the picture is either a picture immediately preceding an I picture or a picture immediately preceding a B picture or P picture that refers only to a picture earlier in display time order. The value $(R*(Init1+(A+1)*s)-TotalB)$ described in the third embodiment is stored in the BufferOccupancy field in the EPSEI. Alternatively, the value $(R*(Init1+(A+1)*s)-TotalB)$ divided by the bit rate R may be stored in the BufferOccupancy field.

The operation of the video decoding apparatus according to the sixth embodiment will be described. The video decoding apparatus of the sixth embodiment differs from the video decoding apparatus of the third embodiment in a portion of the operation of the picture decoding/display time determining unit 23. The following therefore describes the portion of the operation of the picture decoding/display time determining unit 23 that differs.

The picture decoding/display time determining unit 23 checks the slice NUH when analyzing the header information of the target picture passed from the header information analyzing unit 22. When the value of NalUnitType carried in the NUH is 6 or 7, the picture decoding/display time determining unit 23 determines that the picture to be decoded is a BLA picture.

When the picture to be decoded is a BLA picture, the picture decoding/display time determining unit 23 uses, as the decoding delay CpbRemovalDelay of the BLA picture, the value calculated in the following manner, not the value of the CpbRemovalDelay carried in the PTSEI appended to the BLA picture.

Let A denote the number of pictures counted from the picture that immediately follows the most recent BPSEI-appended picture (hereinafter referred to as the Pic1) before the BLA picture (hereinafter referred to as the Pic2) up to the picture that immediately precedes the Pic2. From the value B of CpbRemovalDelay of the Pic2, the picture decoding/display time determining unit 23 derives the first correction value Mod1 as $A*(B/(A-1))$. $B/(A-1)$ corresponds to the time difference between successive pictures (the unit is tc). B/(A−1) will hereinafter be designated as "s".

The picture decoding/display time determining unit 23 calculates the second correction value Mod2 in accordance with the method of the third embodiment by using, as the value (R*(Init1+(A+1)*s)−TotalB) described in the third embodiment, the value stored in the BufferOccupancy field in the EPSEI appended to the picture immediately preceding the BLA picture (or the value multiplied by R if the value divided by the bit rate R is stored).

Next, the picture decoding/display time determining unit 23 compares the number of pictures to be reordered, R1, which is defined in the SPS that the picture immediately preceding the Pic2 refers to, with the number of pictures to be reordered, R2, that a non-TFD picture immediately following the Pic2 refers to. The field that indicates the number of pictures to be reordered in the SPS is SpsNumReorderPics according to the method disclosed in the previously cited non-patent document.

When R2 is larger than R1, the picture decoding/display time determining unit 23 calculates a third correction value Mod3 of PTSEI as (R2−R1)*B/(A−1). Otherwise, the picture decoding/display time determining unit 23 sets the third correction value Mod3 of PTSEI to 0. Then, the picture decoding/display time determining unit 23 corrects the CpbRemovalDelay of the Pic2 to (Mod1+Mod2+Mod3).

Next, a seventh embodiment will be described. In the seventh embodiment, the video encoding apparatus corrects the CpbRemovalDelay of the BLA picture when splicing two encoded video data streams. At this time, the video encoding apparatus adds a parameter that indicates whether the spliced encoded video data can be continuously decoded and displayed across the BLA picture.

The method of correcting the CpbRemovalDelay of the BLA picture is essentially the same as the method that the picture decoding/display time determining unit 23 in the sixth embodiment uses to correct the CpbRemovalDelay.

Figure 16:
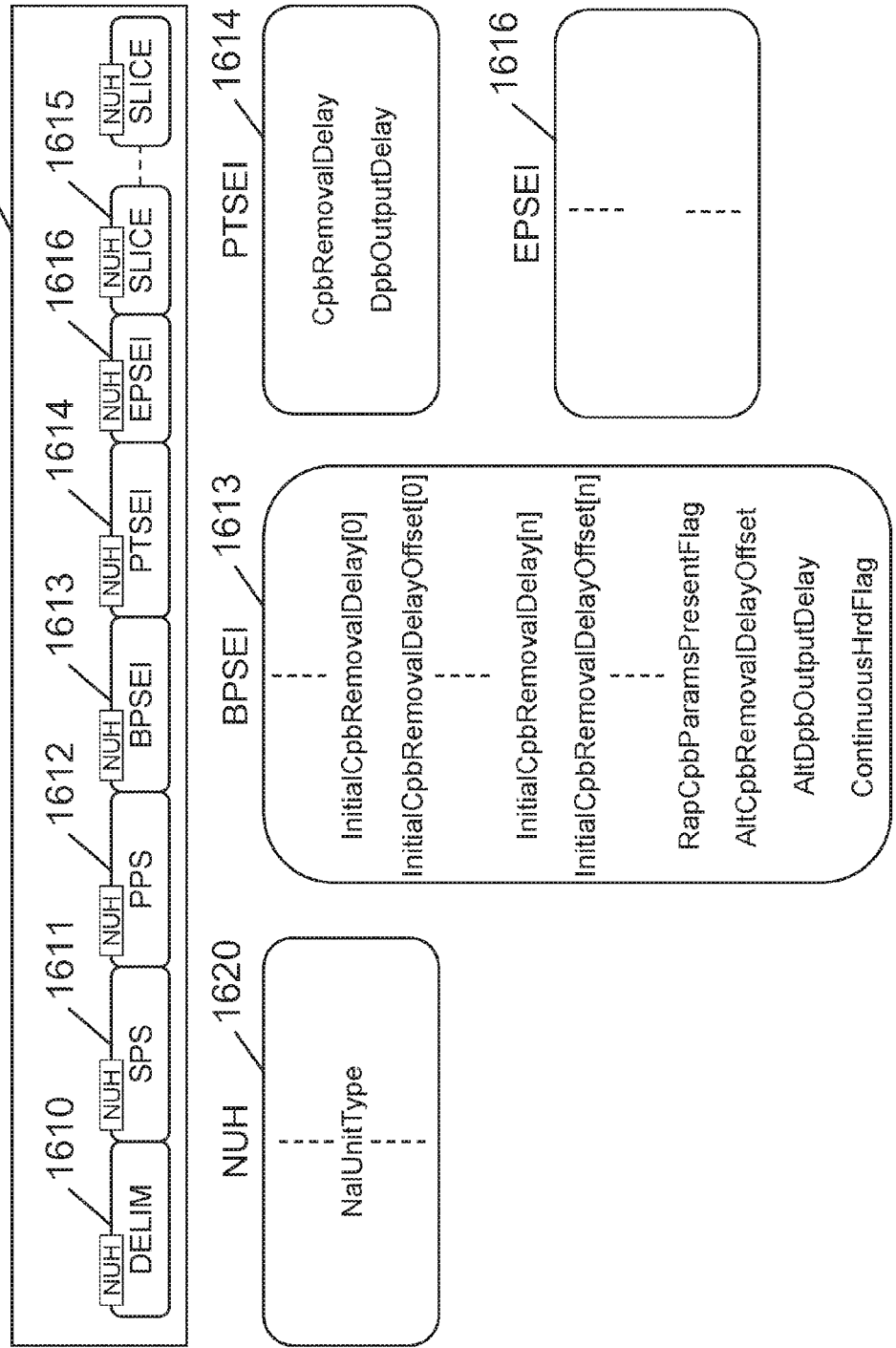
FIG. 16 is a diagram for explaining the data structure of one picture in encoded video according to a seventh embodiment.

FIG. 16 illustrates the data structure of one picture contained in encoded video according to the seventh embodiment. The data structure 1600 of one picture contained in encoded video illustrated in FIG. 16 differs from the data structure 1400 illustrated in FIG. 14 in that the BPSEI NAL unit 1613 includes a ContinuousHrdFlag field. The other six NAL units 1610 to 1612 and 1614 to 1617 are identical to the corresponding NAL units 1410 to 1412 and 1414 to 1417 of the data structure 1400 illustrated in FIG. 14.

The ContinuousHrdFlag field indicates whether the video decoding apparatus can continuously decode and display the encoded video data across the BLA picture to which the BPSEI has been attached.

The ContinuousHrdFlag field may be contained, not in the BPSEI, but in the SPS 1611 or some other NAL unit.

The operation of the video encoding apparatus according to the seventh embodiment will be described. The video encoding apparatus of the seventh embodiment differs from the video encoding apparatus of the fifth embodiment in a portion of the operation of the data splicing unit 15. The following therefore describes the portion of the operation of the data splicing unit 15 that differs.

The data splicing unit 15 receives the second encoded video data stream from the splicing point identification information processing unit 14, and splices it to the trailing end of the first encoded video data stream that is spliced temporally upstream of the splicing point. At this time, the data splicing unit 15 compares at least one of picture parameters that indicate the characteristics of the pictures contained in the first and second encoded video data streams.

For example, if, of the picture parameters of the first and second encoded video data streams, the picture size or the picture rate differs between the two encoded video data streams, the data splicing unit 15 sets the value of the parameter ContFlag, which indicates whether the spliced encoded video data can be continuously decoded and displayed across the splicing point, to 0 which indicates that the video data is unable to be continuously decoded and displayed. On the other hand, if the picture size and the picture rate are the same between the first and second encoded video data streams, the data splicing unit 15 calculates the CpbRemovalDelay of the BLA picture in the same way that the picture decoding/display time determining unit 23 in the sixth embodiment corrects the CpbRemovalDelay. The data splicing unit 15 calculates the value corresponding to the BufferOccupancy field in the EPSEI, i.e., the value used to calculate the second correction value Mod2, in accordance with the method of calculation that the encoding control unit 12 in the sixth embodiment uses to calculate the value of the BufferOccupancy field. Further, the data splicing unit 15 sets the ContFlag parameter to 1 which indicates that the spliced encoded video data can be continuously decoded and displayed.

Besides the picture size and picture rate, the color difference component format of the picture or the pixel resolution of the picture may be added as a picture parameter for determining whether the spliced encoded video data can be continuously decoded and displayed across the splicing point. In this case, if all of these parameters are the same between the first and second encoded video data streams, it is determined that the spliced encoded video data can be continuously decoded and displayed across the splicing point.

When the value of the ContFlag parameter is 0, the data splicing unit 15 sets the value of the ContinuousHrdFlag field in the BPSEI appended to the BLA picture to 0 which indicates that the spliced encoded video data is unable to be continuously decoded and displayed. On the other hand, when the value of the ContFlag parameter is 1, the data splicing unit 15 sets the value of the ContinuousHrdFlag field in the BPSEI appended to the BLA picture to 1 which indicates that the spliced encoded video data can be continuously decoded and displayed. Further, the data splicing unit 15 corrects the value of the decoding delay CpbRemovalDelay of the starting picture, i.e., the BLA picture, of the second encoded video data stream to the value calculated as described above.

The operation of the video decoding apparatus according to the seventh embodiment will be described. The video decoding apparatus of the seventh embodiment differs from the video decoding apparatus of the first embodiment in a portion of the operation of the picture decoding/display time determining unit 23. The following therefore describes the portion of the operation of the picture decoding/display time determining unit 23 that differs.

When the picture to be decoded is a BLA picture, the picture decoding/display time determining unit 23 refers to the value of the ContinuousHrdFlag field in the BPSEI appended to the BLA picture.

When the value of the ContinuousHrdFlag field is 1, i.e., when the spliced encoded video data can be continuously decoded and displayed across the splicing point, the picture decoding/display time determining unit 23 uses the CpbRemovalDelay of the PTSEI appended to the BLA picture, directly as the decoding delay CpbRemovalDelay of the BLA picture. On the other hand, when the value of the ContinuousHrdFlag field is 0, i.e., when the spliced encoded video data is unable to be continuously decoded and displayed across the splicing point, the picture decoding/display time determining unit 23 determines the decoding time of the BLA picture, not from the CpbRemovalDelay, but by using the value of the initial decoding delay information InitialCpbRemovalDelay included in the BPSEI. In this case, the picture decoding/display time determining unit 23 calculates the decoding time of the BLA picture from the InitialCpbRemovalDelay by reference to time 0 which is set later than the decoding time of the picture immediately preceding the BLA picture. Alternatively, the picture decoding/display time determining unit 23 may set the time 0 later than the time at which the display of all the encoded pictures preceding the BLA picture is completed.

Figure 17:
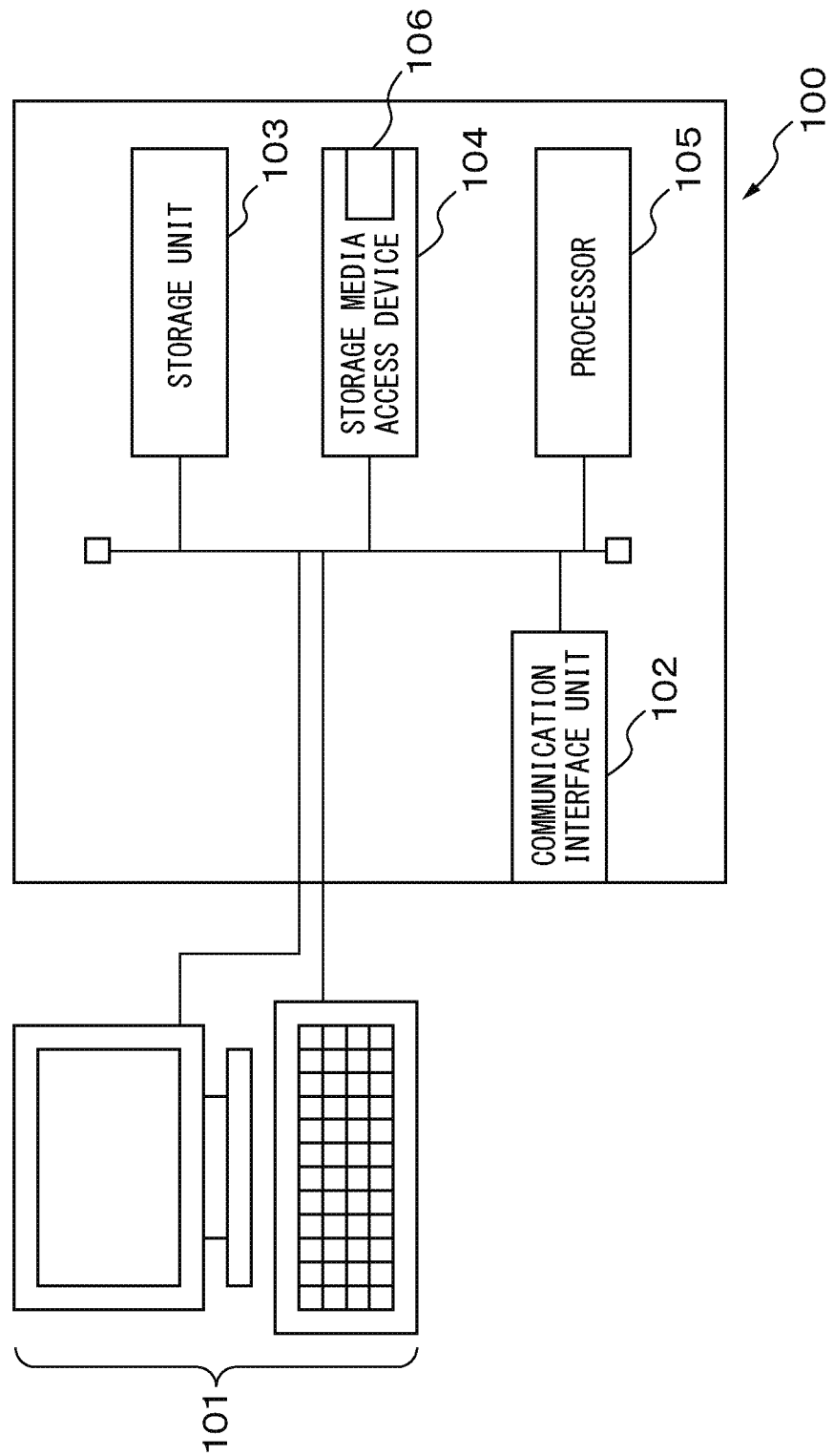
FIG. 17 is a diagram illustrating the configuration of a computer that operates as the video encoding apparatus or video decoding apparatus by executing a computer program for implementing the functions of the various units in the video encoding apparatus or video decoding apparatus according to any one of the embodiments or their modified examples.

FIG. 17 is a diagram illustrating the configuration of a computer that operates as the video encoding apparatus or video decoding apparatus by executing a computer program for implementing the functions of the various units in the video encoding apparatus or video decoding apparatus according to any one of the above embodiments or their modified examples.

The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and a mouse, and a display device such as a liquid crystal display. Alternatively, the user interface unit 101 may include a device, such as a touch panel display, into which an input device and a display device are integrated. The user interface unit 101 generates, for example, in response to a user operation, an operation signal for selecting video data to be encoded, encoded video data to be edited, or encoded video data to be decoded, and supplies the operation signal to the processor 105. The interface unit 101 may also display the decoded video data received from the processor 105.

The communication interface unit 102 may include a communication interface for connecting the computer 100 to a video data generating apparatus, for example, a video camera, and a control circuit for the communication interface. Such a communication interface may be, for example, a Universal Serial Bus (USB) interface.

Further, the communication interface unit 102 may include a communication interface for connecting to a communication network conforming to a communication standard such as the Ethernet (registered trademark), and a control circuit for the communication interface.

In the latter case, the communication interface 102 receives video data to be encoded, encoded video data to be edited, or encoded video data to be decoded, from another apparatus connected to the communication network, and passes the received data to the processor 105. Further, the communication interface 102 may receive encoded video data, spliced encoded video data, or decoded video data from the processor 105 and may transmit the data to another apparatus over the communication network.

The storage unit 103 includes, for example, a readable/writable semiconductor memory and a read-only semiconductor memory. The storage unit 103 stores a computer program for video encoding, video editing, or video decoding to be executed on the processor 105, and also stores the data generated as a result of or during the execution of the program.

The storage media access device 104 is a device that accesses a storage medium 106 such as a magnetic disk, a semiconductor memory card, or an optical storage medium. The storage media access device 104 accesses the storage medium 106 to read out, for example, the computer program for video encoding, video editing, or video decoding to be executed on the processor 105, and passes the readout computer program to the processor 105.

The processor 105 generates encoded video data by executing the video encoding computer program according to any one of the above embodiments or their modified examples. The processor 105 then stores the encoded video data generated in the storage unit 103, or transmits the generated data to another apparatus via the communication interface unit 102. Further, the processor 105 generates spliced encoded video data by splicing together two encoded video data streams by executing the video editing computer program according to any one of the above embodiments or their modified examples. The processor 105 then stores the spliced encoded video data generated in the storage unit 103, or transmits the generated data to another apparatus via the communication interface unit 102. Furthermore, the processor 105 decodes the encoded video data by executing the video decoding computer program according to any one of the above embodiments or their modified examples. The processor 105 then stores the decoded video data in the storage unit 103, presents the data to the user interface unit 101 for display, or transmits the data to another apparatus via the communication interface unit 102.

A computer program which is executed on a computer to implement the functions of the various units constituting the video encoding apparatus or video decoding apparatus according to each of the above embodiments or their modified examples may be distributed in the form stored in a semiconductor memory or in the form recorded on a recording medium such as an optical recording medium. The term "recording medium" used here does not a carrier wave.

Of the various units constituting the video encoding apparatus according to each of the above embodiments or their modified examples, the apparatus incorporating the splicing point identification information processing unit 14 and the data splicing unit 15 that are relevant to the video editing may be provided separately from the apparatus incorporating the encoding control unit 12 and the picture encoding unit 13 that are relevant to the video encoding.

The video encoding apparatus and video decoding apparatus according to the above embodiments or their modified examples are used in various applications. For example, the video encoding apparatus and video decoding apparatus are incorporated in a video camera, a video transmitting apparatus, a video receiving apparatus, a video telephone system, a computer, or a mobile telephone.

What is claimed is:

1. A video decoding apparatus for decoding video data encoded by inter-frame predictive coding, comprising:
a picture time determining unit which, when the encoded video data contains information indicating that the encoded video data has been generated by splicing first encoded video data to a trailing end of second encoded video data, information indicating that one or more encoded pictures that have been discarded from the encoded video data and are later in encoding order than a starting encoded picture in the first encoded video data, the starting encoded picture being a picture immediately following a splicing point at which the second encoded video data and the first encoded video data are spliced, decoding delay correction information for correcting a decoding delay of a picture that follows the starting encoded picture, and display delay correction information for correcting a display delay of the starting encoded picture, then corrects the display delay of the starting encoded picture based on the display delay correction information, while correcting, based on the decoding delay correction information, the decoding delay of the picture that follows the starting encoded picture.

2. The video decoding apparatus according to claim 1, wherein the decoding delay correction information includes a value corresponding to the number of pictures that are later in encoding order than the starting encoded picture and are encoded with referring to a picture that is earlier in encoding order than the starting encoded picture.

3. The video decoding apparatus according to claim 1, wherein the display delay correction information carries a value corresponding to the number of pictures occurring between a display time of a picture that is earliest in display order among the pictures that are later in encoding order than the starting encoded picture and a display time of the starting encoded picture.

4. The video decoding apparatus according to claim 1, wherein the picture time determining unit determines the decoding delay of the starting encoded picture in such a manner as to offset any disparity between the amount of data held in a receive buffer at the time of decoding of the starting encoded picture, as calculated from encoded pictures preceding the splicing point, and the amount of data actually held in the receive buffer.

5. The video decoding apparatus according to claim 1, wherein when the encoded video data contains information indicating whether the encoded video data can be continuously decoded and displayed across the splicing point, if the information indicates that the encoded video data can be continuously decoded and displayed, the picture time determining unit takes as a decoding delay value for the starting encoded picture the value of decoding delay information contained in the encoded video data, while, if the information indicates that the encoded video data is unable to be continuously decoded and displayed, the picture time determining unit takes as the decoding delay value for the starting encoded picture the value of initial decoding delay information contained in the encoded video data.

\* \* \* \* \*